US009043694B2

(12) United States Patent
Petronijevic et al.

(10) Patent No.: US 9,043,694 B2
(45) Date of Patent: May 26, 2015

(54) METHODS AND APPARATUS TO MAINTAIN ORDERED RELATIONSHIPS BETWEEN SERVER AND CLIENT INFORMATION

(75) Inventors: Dejan Petronijevic, Mississauga (CA); Laura Brindusa Fritsch, Redwood City, CA (US); Viera Bibr, Mississauga (CA); Michael Shenfield, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 551 days.

(21) Appl. No.: 12/818,756

(22) Filed: Jun. 18, 2010

(65) Prior Publication Data

US 2010/0325531 A1 Dec. 23, 2010

Related U.S. Application Data

(60) Provisional application No. 61/218,793, filed on Jun. 19, 2009.

(51) Int. Cl.
G06F 17/00 (2006.01)
G06F 21/62 (2013.01)
G06F 9/46 (2006.01)
G06F 17/21 (2006.01)
G06F 3/0481 (2013.01)
G06F 3/12 (2006.01)
G06F 17/30 (2006.01)

(52) U.S. Cl.
CPC .......... *G06F 21/6218* (2013.01); *G06F 17/218* (2013.01); *G06F 3/0481* (2013.01); *G06F 17/217* (2013.01); *G06F 3/1246* (2013.01); *G06F 17/212* (2013.01); *G06F 17/30905* (2013.01); *G06F 9/468* (2013.01)

(58) Field of Classification Search
CPC ................ G06F 17/212; G06F 17/217; G06F 17/30905; G06F 3/0481; G06F 3/218; G06F 17/218
USPC .......................... 715/253, 234–237, 255, 739
See application file for complete search history.

(56) References Cited

U.S. PATENT DOCUMENTS

2001/0029604 A1* 10/2001 Dreyband et al. ................. 717/7
2005/0086584 A1 4/2005 Sampathkumar et al.
2007/0174284 A1 7/2007 Hashimoto et al.
2008/0104124 A1* 5/2008 Bao et al. ................... 707/104.1
(Continued)

FOREIGN PATENT DOCUMENTS

EP 1816586 8/2007
WO 02/46893 6/2002

OTHER PUBLICATIONS

WiPRO—"Wipro XML Document Mangement Enabler" by WIPRO Technology total 2 Pages "2006".*
(Continued)

*Primary Examiner* — Quoc A Tran
(74) *Attorney, Agent, or Firm* — Fish & Richardson P.C.

(57) ABSTRACT

Example methods and apparatus to maintain ordered relationships between server and client information are disclosed. A disclosed example method involves defining, via an extensible markup language (XML) schema for an XML document that is managed by an XML management document (XDM) server (XDMS), an attribute with a unique value such that every element within sequence of the XML document is consistently addressable.

12 Claims, 18 Drawing Sheets

(56) References Cited

U.S. PATENT DOCUMENTS

| | | | |
|---|---|---|---|
| 2008/0235186 A1* | 9/2008 | Laurila | 707/3 |
| 2008/0256117 A1* | 10/2008 | Laurila et al. | 707/102 |
| 2008/0275919 A1* | 11/2008 | Murthy et al. | 707/200 |
| 2008/0319948 A1* | 12/2008 | Berg et al. | 707/3 |
| 2009/0254572 A1 | 10/2009 | Redlich et al. | |
| 2009/0327323 A1* | 12/2009 | Altinel et al. | 707/101 |
| 2010/0216501 A1* | 8/2010 | Sung et al. | 455/518 |
| 2010/0275115 A1* | 10/2010 | Oh et al. | 715/234 |
| 2011/0088091 A1 | 4/2011 | Petronijevic et al. | |

OTHER PUBLICATIONS

Patent Cooperation Treaty, "International Search Report," issued by the International Searching Authority in connection with related PCT application No. PCT/US2010/039189, mailed Oct. 11, 2010 (4 pages).

Patent Cooperation Treaty, "Written Opinion of the International Searching Authority," issued by the International Searching Authority in connection with related PCT application No. PCT/US2010/039189, mailed Oct. 11, 2010 (7 pages).

Vlist, Eric van der, "XML Shema," O'Reilly & Associates, Inc., Jun. 2002, 3 pages.

Patent Cooperation Treaty, "International Preliminary Report on Patentability," issued in connection with PCT application No. PCT/US2010/039189, completed Dec. 22, 2011 (16 pages).

Rosenberg, J., "The Extensible Markup Language (XML) Configuration Access Protocol (XCAP)," Network Working Group, Request for Comments: 4825, May 2007, 62 pages.

Open Mobile Alliance (OMA), "XML Document Management Requirements," Candidate Version 2.1, Mar. 31, 2009, 54 pages.

Open Mobile Alliance (OMA), "XML Document Management Architecture," Draft Version 2.1, May 27, 2009, 28 pages.

Open Mobile Alliance (OMA), "XML Document Management (XDM) Specification," Candidate Version 2.0, Sep. 16, 2008, 80 pages.

"Wipro XML Document Management Enabler," Wipro Technologies, 2006, 2 pages.

"IP Multimedia Subsystem," Wikipedia, [retrieved from http://en.wikipedia.org/w/index.php?title=IP_Multimedia_Subsystem&printable=yes on Jun. 10, 2009], May 27, 2009, 13 pages.

* cited by examiner

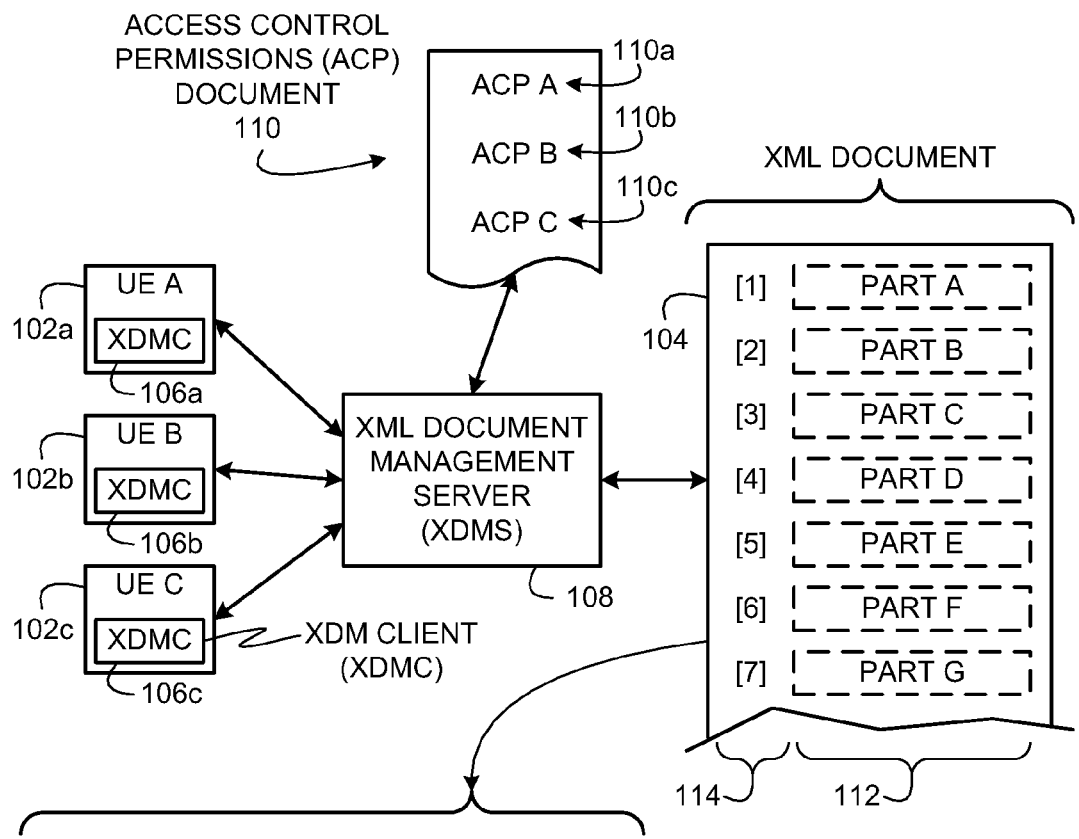

```
<address-book>
 <heading date="2009-01-01">Business Address Book</heading>
 <entry>
  <person>
   <first>Alice</first>
   <last>Smith</last>
  </person>
  <org>Acme, Inc.</org>
  <phone kind="w">555-555-2443</phone>
 </entry>
```
PART A

```
 <entry>
  <person>
   <first>Bob</first>
   <last>Lee</last>
  </person>
  <org>Acme, Inc.</org>
  <phone kind="w">555-555-7862</phone>
 </entry>
```
PART B

```
 <entry>
  <person>
   <first>Carol</first>
   <last>Vern</last>
  </person>
  <org>Acme, Inc.</org>
  <phone kind="w">555-555-8372</phone>
 </entry>
```
PART C

METHODS AND APPARATUS TO MAINTAIN ORDERED RELATIONSHIPS BETWEEN SERVER AND CLIENT INFORMATION

RELATED APPLICATIONS

This Patent claims the benefit of U.S. Provisional Patent Application No. 61/218,793, filed on Jun. 19, 2009, which is hereby incorporated herein by reference in its entirety.

FIELD OF THE DISCLOSURE

The present disclosure relates generally to network communications and, more particularly, to methods and apparatus to maintain ordered relationships between server and client information.

BACKGROUND

Standardized document formats are often used to define how documents are created and how information is stored and maintained therein. An example of such a standardized document format is the extensible markup language (XML) standard. The Open Mobile Alliance (OMA) is a group that defines XML Document Management (XDM) for use in distributed access. For example, an OMA XDM enabler defines mechanisms for manipulating user-specific, service-related information stored in XML documents on servers. Such information is typically stored in the network where it can be located, accessed and manipulated (e.g., created, changed, and/or deleted). The XDM specifications specify how such information should be defined in XML documents. In addition, the XDM specifications specify a common protocol for accessing and manipulating such XML documents.

As is known, XML documents can be employed for many different types of uses. Some of those uses are application specific (e.g., such as storing subscriber preferences for a particular enabler (e.g., a Presence Subscription Policy or push-to-talk-over-cellular (PoC) Groups), and others are not application specific (e.g., storing a list of uniform resource identifiers (URIs), such as a list of friends, that can be re-used from multiple enablers).

In some instances, XDM can be used to facilitate authorizing individuals to access presence information for other individuals. In addition, XDM can be used to facilitate session initiation of many individuals to the same conference call. In such instances, there are common usages which are shared across multiple OMA enablers. For example, a URI list defined within a presence enabler could be used to initiate a conference call between an online group of friends.

BRIEF DESCRIPTION OF THE DRAWINGS

FIG. 1 depicts example user equipment clients requesting access to a shared document.

DETAILED DESCRIPTION

Figure 2:
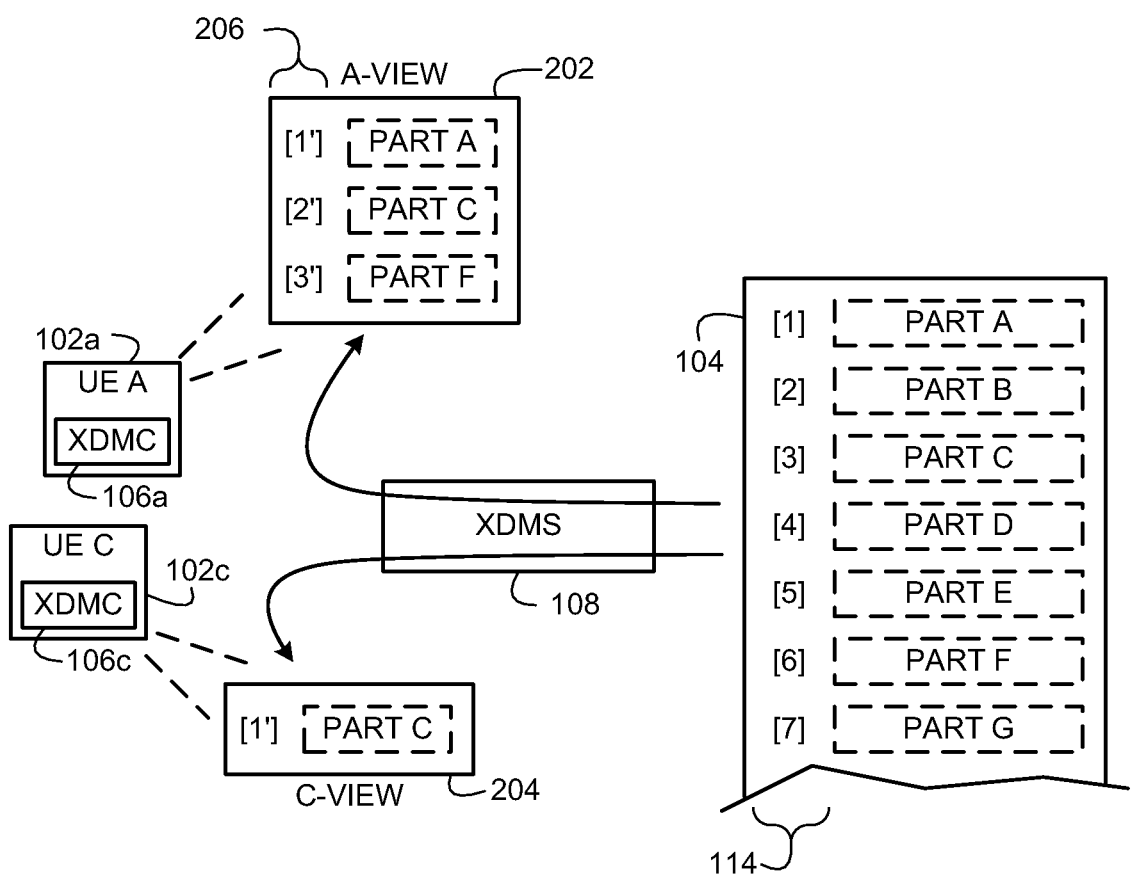
FIG. 2 depicts the example user equipment clients of FIG. 1 accessing respective views of the shared document of FIG. 1.

Although the following discloses example methods and apparatus including, among other components, software executed on hardware, it should be noted that such methods and apparatus are merely illustrative and should not be considered as limiting. For example, any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used to maintain ordered relationships between server and client information that is accessed by a plurality of users in a network system. The example methods and apparatus described herein can be used in connection with mobile communication devices, mobile computing devices, or any other device capable of accessing information over a wired or wireless network. Such devices, also referred to as user equipment (UE), clients, or terminals, may include mobile smart phones (e.g., a BLACKBERRY® smart phone), personal digital assistants (PDA), laptop/notebook/netbook computers, desktop computers, etc.

The example methods and apparatus are described herein in connection with the Open Mobile Alliance (OMA) standard related to extensible markup language (XML) document management (XDM), which, among other things, defines how to access, modify, create, etc. information in XML documents stored on network storage entities. However, the example methods and apparatus may additionally or alternatively be implemented in connection with other information management and access standards and document format standards other than the XML format. In addition, although the example methods and apparatus described herein can be implemented in any network environment providing access to information stored on the network, the example methods and apparatus are described herein in connection with telecommunication network systems such as the network system 300 of FIG. 3 having an internet protocol (IP) multimedia subsystem (IMS).

The OMA XDM standard defines how to manipulate user-specific, service-related information stored in XML documents. Such information is often shared between different users and is expected to be stored in the network where it can be located, accessed and manipulated (e.g. created, changed, and deleted) by those users. The XDM standard also defines how such information is to be defined in structured XML documents and defines a common protocol to access and manipulate such XML documents, by authorized principals (i.e., users with assigned access rights). Users access documents via XDM clients (XDMCs) such as UE or terminals, and access to the documents is managed in a network by one or more XDM servers (XDMSs) based on different access permissions uniquely corresponding to respective users.

In some example implementations, example methods and apparatus implemented in accordance with the teachings described herein may involve receiving, at a server (e.g., an XDM server), a request to access at least one element of a standard-formatted document (e.g., an XML document). The requested element may correspond to an element sequence of the standard-formatted document, in which each of a plurality of elements of the element sequence has a corresponding access control permission (ACP). In some instances, access is allowed to the requested element only when every element of the element sequence is accessible based on the ACPs. In some example implementations, requests to change one or more ACPs may be evaluated and accepted or rejected based on whether such ACP change(s) would result in preserving or maintaining an ordered or indexed relationship between the elements in the standard-formatted document and the elements in a subset of the standard-formatted document. Such maintaining of the ordered or indexed relationship may be achieved by treating all elements of an element sequence the same (e.g., either all elements are retrievable based on their ACPs or all elements are not retrievable based on their ACPs). In some example implementations, a tangible machine accessible medium may be provided with instructions stored thereon that, when executed, cause a machine to implement such example methods and apparatus.

In some example implementations, example methods and apparatus implemented in accordance with the teachings described herein may involve generating, at a server (e.g., an XDM server), a document subset corresponding to a portion of a standard-formatted document (e.g., an XML document). The standard-formatted document may include an element sequence having a plurality of elements. The example methods and apparatus may further involve identifying a first group of the elements having ACPs set to retrievable and a second group of the elements having ACPs set to not retrievable. The elements of the first group may be provided in the document subset, and placeholders may be provided in the document subset in substitution for the elements of the second group. The placeholders may be blank or may include values indicative of restricted access to the second group of elements. In some example implementations, the elements of the first group and the placeholders are arranged in the document subset in a same order of the plurality of elements in the standard-formatted document. In some example implementations, the document subset may be generated in response to a request from a user for the standard-formatted document and the ACPs may correspond to the user. In some example implementations, a tangible machine accessible medium may be provided with instructions stored thereon that, when executed, cause a machine to implement such example methods and apparatus.

In some example implementations, example methods and apparatus implemented in accordance with the teachings described herein may involve generating, at a server (e.g., an XDM server), a document subset corresponding to a portion of a standard-formatted document (e.g., an XML document). The standard-formatted document may include an element sequence having a plurality of elements. A first group of elements having ACPs set to retrievable may be provided in the document subset, and for each element of the first group provided in the document subset, a corresponding server index value may be provided to indicate a unique index of the element in the standard-formatted document. In some example implementations, each corresponding server index value provided in the document subset may be provided as commented text in a corresponding element. In other example implementations, server index value provided in the document subset may be provided in an index map structure in the document subset. Such index map structure may be appended to the end of the document subset. In some example implementations, the document subset may be generated in response to receiving a request from a user requesting access to the standard-formatted document, and the ACPs may correspond to the user.

In some example implementations, example methods and apparatus implemented in accordance with the teachings described herein may involve generating, at a server (e.g., an XDM server), a document subset corresponding to a portion of a standard-formatted document (e.g., an XML document). The standard-formatted document may include an element sequence having a plurality of elements. For each element having an ACP set to retrievable, a corresponding server index value (e.g., a unique index of the element in the standard-formatted document) may be retrieved from a schema, and the element and the corresponding server index value may be provided in the document subset. In some example implementations, each server index value may be stored in an attribute of a corresponding element in the document subset. In addition, for each element having its access control permission set to retrievable, a corresponding client index value may be provided in the document subset. In some example implementations, the document subset may be generated in response to a request from a user for the standard-formatted document and the ACPs may correspond to the user. In some example implementations, a tangible machine accessible medium may be provided with instructions stored thereon that, when executed, cause a machine to implement such example methods and apparatus.

In some example implementations, example methods and apparatus implemented in accordance with the teachings described herein may involve generating, at a server (e.g., an XDM server), a document subset corresponding to a portion of a standard-formatted document (e.g., an XML document). The standard-formatted document may include an element sequence having a plurality of elements, and each of the elements may have a corresponding server index value corresponding to a unique index of the element in the standard-formatted document. A group of the plurality of elements having ACPs set to retrievable may be provided in the document subset, and a corresponding client index value may be provided for each element of the group. In response to receiving a change request for at least one element of the group, the server index value of the at least one element may be determined based on a matching of the client index value of the at least one element and a count of at least some of the plurality of elements having respective ones of the ACPs set to retrievable. In addition, the at least one element of the group may be changed as requested after determining the server index value of the at least one element based on the matching. In some example implementations, the count of the at least some of the plurality of elements having respective ones of the ACPs set to retrievable is determined by counting, in a sequential order, the ones of the elements having respective ones of the ACPs set to retrievable and not counting ones of the elements having corresponding access control permissions set to not retrievable. In some example implementations, the document subset may be generated in response to a request from a user for the standard-formatted document and the ACPs may correspond to the user. In some example implementations, a tangible machine accessible medium may be provided with instructions stored thereon that, when executed, cause a machine to implement such example methods and apparatus.

Turning to FIG. 1, example user equipment (UE) clients A-C 102*a*-*c* are shown requesting access to a shared document 104. In the illustrated example, each of the UE A-C clients 102*a*-*c* runs a respective XDMC 106*a*-*c* that communicates with an XDMS 108 to access the shared document 104. The shared document 104 is shown as an XML document. The XDM standard can be used to manage access to XML documents belonging to authorized users based on access control permissions (ACPs). In the illustrated example of FIG. 1, an ACP document 110 is provided to specify different user access permissions for the XML document 104. The ACP document 110 is shown as having ACPs A-C 110*a*-*c*, each of which corresponds to a respective one of the XDMCs 106*a*-*c*. More specifically, the ACPs A-C 110*a*-*c* correspond to XDM authorized users or principals (discussed below) associated with the XDMCs 106*a*-*c*. In particular, the ACP A 110*a* corresponds to a principal corresponding to the XDMC 106*a*, the ACP B 110*b* corresponds to a principal corresponding to the XDMC 106*b*, and the ACP C 110*c* corresponds to a principal corresponding to the XDMC 106*c*.

Authorized XDM users are called principals, which include admin principals, primary principals, and regular principals. A primary principal is a user that owns a given document (e.g., the XML document 104) and has full access rights (e.g., read, write, delete). An admin principal is a user that is authorized to modify access permissions associated with a document and delegate some of those rights to other principals. Documents have a primary principal and an admin principal that may be assigned, for example, at document creation time. In some instances, the primary principal and the admin principal of a document can be the same user. A regular principal is a user that is assigned some access permissions associated with a document.

In the illustrated example of FIG. 1, the XML document 104 includes different parts A-G, which can be instances of XML elements or attributes, and each of the parts A-G 112 is shown in association with a respective server document index number [1]-[7] 114. In the illustrated example, each of the server document index numbers [1]-[7] 114 is a unique index value for its respective one of the parts A-G 112 in the XML document 104. In the illustrated example, the XML document 104 stores address book information, and each of the parts A-G 112 is an element instance of an element named 'entry.' As shown in detail for parts A-G of the XML document 104, each element instance A-G 112 contains contact information for a respective person (e.g., Alice Smith, Bob Lee, and Carol Vern for element instances A-C 112).

Each of the XDMCs 106*a*-*c* is associated with a respective principal. The XML document 104 is administered and managed by an admin principal that creates different access permissions stored in the ACPs A-C 110*a*-*c* to define which of the parts A-G 112 are accessible by respective principals associated with the XDMCs 106*a*-*c*. For example, a principal corresponding to the XDMC 106*a* may be granted permissions to access (e.g., retrieve, modify, etc.) certain portions (e.g., instances of elements or attributes) of the XML document 104 that are different from other portions accessible by a principal corresponding to the XDMC 106*c*.

Turning to FIG. 2, the UE A and C clients 102*a* and 102*c* are shown accessing respective views 202 and 204 of the shared document 104. In the illustrated examples described herein, client views such as the views 202 and 204 may also be referred to as subsets or document subsets that, as discussed below, include at least a subset of information in a document such as the shared document 104. When the UE A 102*a* submits a request via the XDMC 106*a* to access information in the XML document 104, the XDMS 108 receives and handles the request by confirming the access permissions (e.g., the ACP A 110*a* of FIG. 1) associated with the requesting client, XDMC 106*a*, and returns the assembled subset or view 202 of the document showing only the element or attribute instances of the document for which the XDMC 106*a* is assigned access permissions. Similarly, when the UE C 102*c* submits a request via the XDMC 106*c* to access information in the XML document 104, the XDMS 108 receives and handles the request by confirming the access permissions (e.g., the ACP C 110*c* of FIG. 1) associated with the requesting client, XDMC 106*c*, and returns the assembled subset or view 204 of the document showing only the element or attribute instances of the document for which the XDMC 106*c* is assigned access permissions.

When different element instances (e.g., the element instances A-G 112 of FIG. 1) contained in a sequence (i.e., the XML element named "sequence" which is a child element of the root element and which provides an XML representation of an ordered set of element types within an XML document) of the XML document 104 have different permissions for different principals, the different views for the different principals and the server XML document 104 will have different (e.g., unique) positional indices (e.g., the server document index numbers [1]-[7] 114) for those element instances. If one of the XDMCs 106a-c tries to modify the XML document 104 at the XDMS 108 using its view or subset (e.g., a respective one of the views 202 or 204), an index-based address provided by the XDMC would point to the wrong element instance. For example, referring to FIG. 2, a principal associated with the XDMC 106a has permission to access element instances labeled PART A [1], PART C [3], and PART F [6] of the XML document 104 and, thus, the view 202 for the XDMC 106a includes only those element instances visible to the XDMC 106a. In the illustrated example, the accessible parts A, C, and F are shown as assembled in the view 202 in a sequential order with corresponding view indices 206 indicated by apostrophe (') notation (e.g., [1'], [2'], and [3']). The view indices 206 differ from the server document indices 114. For example, the view 202 includes PART C with a view index of [2'] and PART F with a view index of [3'], while the XML document 104 associates PART C with a view index of [3] and PART F with a view index of [6]. Thus, in the illustrated example, an erroneous document change could be made if the XDMC 106a attempted to modify information in PART C of the view 202 by providing an address to the XDMS 108 pointing to index number 2. This is because, although referring to PART C using index number 2 is correct relative to the client view 202, it would be an incorrect reference relative to the XML document 104 at the XDMS 108 because it would incorrectly point to PART B of the document 104.

The example methods and apparatus described herein can be used to overcome the above-described problems and other problems associated with maintaining ordered relationships between information in client views and server documents to enable maintaining the integrity of information stored on a network. In some example implementations, as discussed in greater detail below in connection with FIG. 6, data access rules are used by XDMSs to create XML views or subsets for requesting XDMCs by treating all element instances of a sequence in a document with the same access permissions. That is, according to some examples, if an admin principal allows access to one element instance in a sequence of a document, all element instances in that sequence of the document must be accessible. Similarly, according to other examples, if the admin principal subsequently restricts access to an element instance of a sequence, access is restricted for all element instances of that sequence of the document.

In other example implementations, as discussed in greater detail below in connection with FIG. 7, XDMSs can be configured to use blank placeholders to replace instances of elements or attributes while generating a subset or view for a requesting XDMC when the access permissions corresponding to the requesting XDMC do not allow access to those elements or attribute instances. In this manner, the view indices (e.g., the view indices 206 of FIG. 2) of a client view would be the same as corresponding server document indices (e.g., the server document indices 114 of FIGS. 1 and 2) of a corresponding XML document for the instances of those elements or attributes of a particular sequence.

In yet other example implementations as discussed in greater detail below in connection with FIGS. 8-10, XDMSs can be configured to insert server-client document index mapping information via commented portions or XML attribute values in client views or subsets. The XDMCs can then be configured to read the server document indices in the client views to provide XDMSs the correct server document index when generating an address for a requested change in the server XML document.

In yet other example implementations as discussed in greater detail below in connection with FIG. 11, XDMSs can be configured to store an ACP document-parts indices key. In this manner, when XDMCs request changes to a server XML document, the XDMS can identify the corresponding document part to be changed based on the client index number and the ordering of access-permitted element instances relative to restricted element instances.

Figure 3:
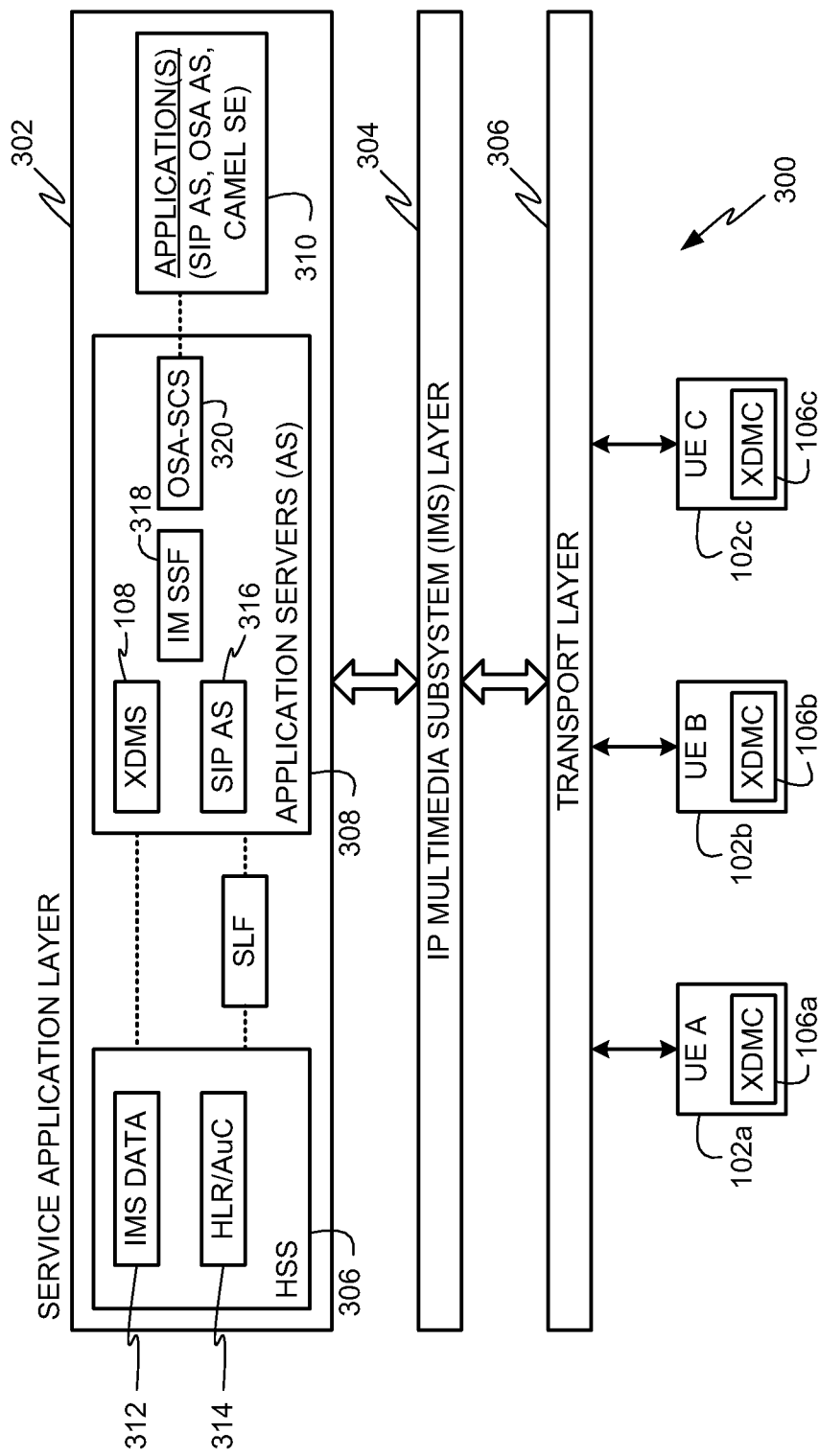
FIG. 3 depicts an example network system in which the example user equipment clients of FIGS. 1 and 2 can access shared information stored in the network system.

Turning now to FIG. 3, the methods and apparatus described herein can be implemented in a communication network 300 implemented using an IP multimedia subsystem (IMS) as shown in FIG. 3. The example network 300 is shown as having a service application layer 302, an IMS layer 304, and a transport layer 306. In the illustrated example, the XDMS 108 of FIGS. 1 and 2 is implemented in the service application layer 302, and the XDMCs 106a-c communicate with the XDMS 108 via the transport layer 306. Although the methods and apparatus are described in connection with the network 300, the methods and apparatus can be implemented in various networks.

Turning in detail to the service application layer 302, in the illustrated example the service application layer 302 includes a home subscriber server (HSS) 306, application servers 308, and one or more applications 310. The HSS 306 stores subscriber profiles (e.g., IMS data 312) and performs authentication and authorization processes (e.g., via a home location register/authentication center (HLR/AuC) 314) to determine communication services and features that users are authorized to access or use. The application servers 308 host and execute services and communicate with the IMS layer 304 using session initiation protocol (SIP). In the illustrated example, the application servers 308 include the XDMS 108, a SIP AS 316, an IP multimedia service switching function (IM SSF) 318, and an open service access-service capability server (OSA-SCS) 320.

In the illustrated example, each of the XDMCs 106a-c initializes communications with the service application layer 302 through a SIP registration process that occurs via the IMS layer 304. After the SIP registration process, the XDMCs 106a-c can communicate with the XDMS 108 via the hypertext transfer protocol (HTTP) to perform document management functions. For example, the XDMCs 106a-c can submit information requests to the XDMS 108 using HTTP messages, and the requests and requested document information can be exchanged between the XDMCs 106a-c and the XDMS 108 via different proxies as described below in connection with FIG. 4.

Figure 4:
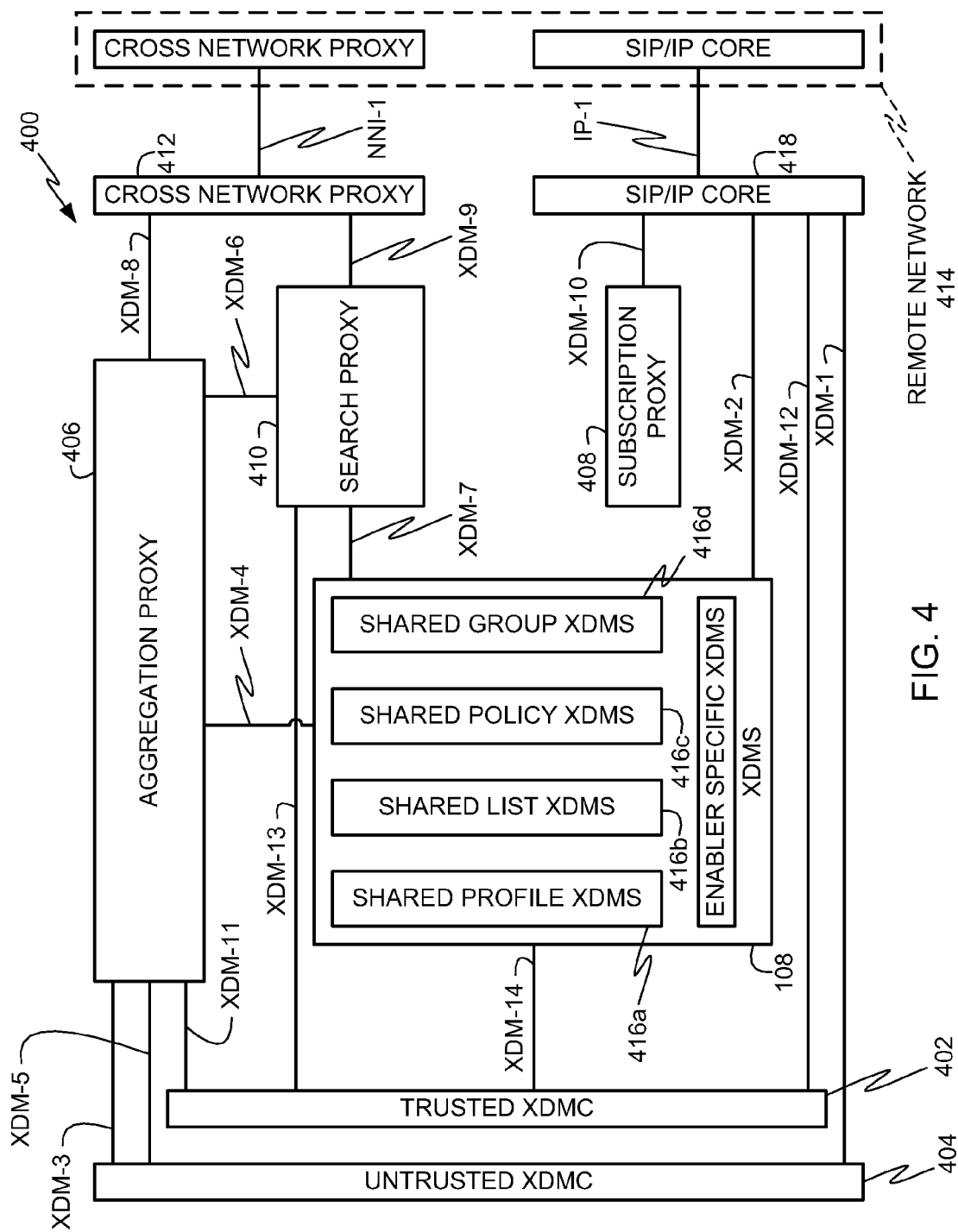
FIG. 4 depicts an example document management system to enable the example user equipment clients of FIGS. 1-3 to access shared information stored in the network system of FIG. 3.

FIG. 4 depicts an example XDM system 400 to enable the XDMCs 106a-c of FIGS. 1-3 to access shared information (e.g., the XML document 104 of FIGS. 1 and 2) stored in the network 300 of FIG. 3. The example XDM system 400 includes a plurality of different proxy interfaces (interfaces XDM-1 through XDM-14 as shown) via which communications with the XDMS 108 can be exchanged to provide the XDMCs 106a-c with access to shared information (e.g., the XML document 104 of FIGS. 1 and 2). The interfaces XDM-1 through XDM-14 are described in greater detail below.

In the illustrated example, the XDM system 400 includes the XDMS 108 in communication with a trusted XDMC 402 and an untrusted XDMC 404. The trusted XDMC 402 or the untrusted XDMC 404 can be any of the XDMCs 106a-c of FIGS. 1-3. To enable communication with the XDMS 108, the XDM system 400 includes an aggregation proxy 406, a subscription proxy 408, a search proxy 410, and a cross-network proxy 412, all of which can be implemented using one or more different entities of the network 300 of FIG. 3. In the illustrated example, the aggregation proxy 406 performs authentication of XDMCs. In addition, the aggregation proxy 406 routes information requests to the XDMS 108 and search requests to the search proxy 410. Information requests can be made using an XML configuration access protocol (XCAP) defined in IETF-RFC 4825. In the illustrated example, the aggregation proxy 406 is a single point of contact for untrusted XDMCs such as the untrusted XDMC 404, and enables the untrusted XDMC 404 to make requests to and receive information from the XDMS 108.

The subscription proxy 408 is configured to provide notifications to XDMCs (e.g., the XDMCs 106a-c of FIGS. 1-3 and the XDMCs 402 and 404) of any changes to documents managed by the XDMS 108. In addition, the subscription proxy 408 also maps XCAP resources to the SIP address of the XDMS 108 to enable proper routing of XCAP messages to the XDMS 108. The search proxy 410 is provided to route and aggregate search requests and responses between XDMCs (e.g., the XDMCs 106a-c, 402, and 404), XDMSs (e.g., the XDMS 108), and the cross-network proxy 412. The cross-network proxy 412 enables XDM systems (similar to the XDM system 400) located in other networks (e.g., a remote network 414) to communicate over a trusted connection and exchange XCAP and search requests and responses with the XDM system 400.

In the illustrated example, the XDMS 108 is shown as a logical grouping or collection of a plurality of different XDMSs 416a-d in the XDM system 400. In particular, the XDMS 108 is shown in connection with a shared profile XDMS 416a, a shared list XDMS 416b, a shared policy XDMS 416c, and a shared group XDMS 416d, all of which are typical XDMSs in an XDM system. In addition, one or more additional enabler specific XDMSs may also be provided. Each of the XDMSs 416a-d provides XML document management services for its respective type of information. For example, the shared profile XDMS 416a manages stored user profiles. The shared list XDMS 416b manages uniform resource identifier (URI) list and group usage list documents. The shared policy XDMS 416c manages user access policies. The shared group XDMS 416d manages group documents. In other example implementations, an XDM system may be provided with fewer or more types of XDMSs.

The XDMCs 402 and 404 communicate with the XDMS 108 via the interfaces XDM-1 through XDM-14 to access documents via the XDMS 108. The interfaces XDM-1, XDM-2, XDM-10, and XDM-12 enable SIP subscribe/notify exchanges between the XDMCs 402 and 404, a SIP/IP core 418, the XDMS 108, and the subscription proxy 408 to register the XDMCs 402 and 404 with the XDM system 400. The interfaces XDM-3 and XDM-4 enable exchanges associated with document management requests/responses and confirmations of access permissions (e.g., access permissions associated with the ACP's A-C 110a-c). The interfaces XDM-5, XDM-6, XDM-7, and XDM-13 enable exchanges associated with search requests/responses. The interface XDM-8 enables forwarding of document management communications to other domains, and the interface XDM-9 enables forwarding of search requests/responses to other domains. The interfaces XDM-11 and XDM-14 enable communications associated with document management accesses (e.g., create, change, delete).

Figure 5:
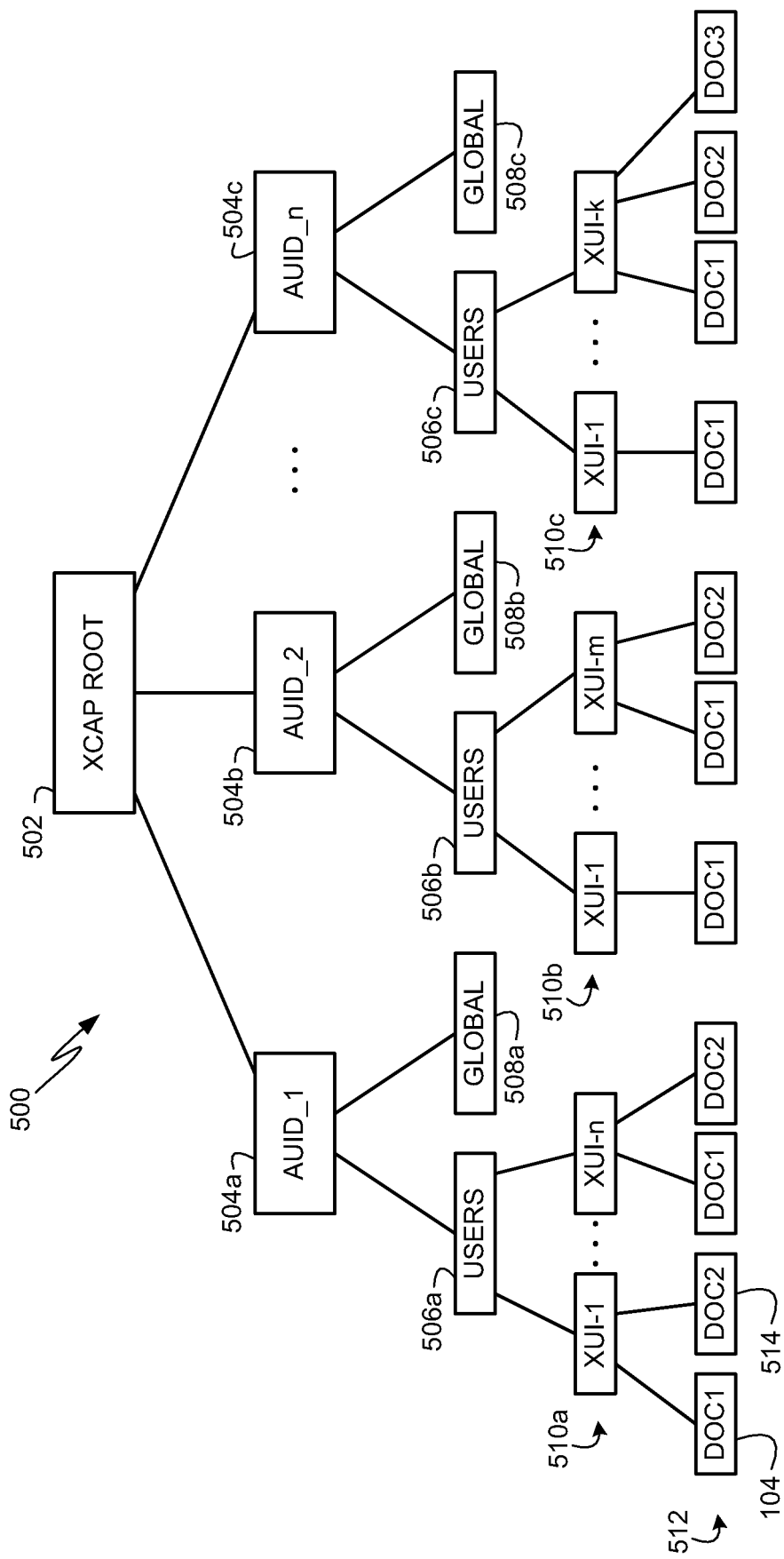
FIG. 5 depicts an example logical storage structure that can be used to store shared documents in the network system of FIG. 3.

FIG. 5 depicts an example logical storage structure 500 of shared documents stored in the network 300 of FIG. 3. The XDMS 108 of FIGS. 1-4 can store documents based on the logical storage structure 500, and the documents can be associated with different application usages. For example, some documents may contain information associated with calendaring applications, while other documents may contain information associated with address books. Documents can also have other uses. For example, some uses can be application specific, while other uses are not application-specific. Example application-specific uses include storing subscriber preferences for particular service enablers (e.g., a presence subscription policy enabler or a push-to-talk over cellular (PoC) groups enabler). Example non-application-specific uses include storing a list of uniform resource identifiers (URIs) (e.g., a list of friends) that can be re-used from multiple enablers.

In some example implementations, the XDM standard can be used to implement a presence subscription policy to facilitate authorization of individuals who may wish to access another individual's presence information to determine whether that individual is presently available on a network for communication. In other example implementations, XDM can be used in a group calling application to specify a group definition to facilitate session initiation of many individuals to the same conference call. In these examples, there is common information that is shared across multiple OMA enablers. For example, a URI list defined within a presence subscription policy enabler could be used to initiate a conference call amongst an online group of friends.

As shown in FIG. 5, the logical storage structure 500 represents a flat tree hierarchy and includes an XCAP root path 502 under which application usage ID (AUID) trees 504a-c are located. Each of the AUID trees 504a-c is shown as having respective users trees 506a-c and global trees 508a-c. Each of the users trees 506a-c is shown as having specific user IDs (XUIs) 510a-c. Below each XUI are one or more documents 512. For example, the XML document 104 of FIGS. 1 and 2 is shown as stored under the XUI-1 user ID tree.

In the illustrated example, each of the AUIDs 504a-c represents a different application usage, and each of the XUIs 510a-c represents a different user or principal under which documents store information pertinent to respective ones of the AUIDs 504a-c. For example, if the AUID 504a represents an address book application usage (i.e., AUID_1='address-book'), the XML document 104 can store contact information for a personal address book owned by the user XUI-1 510a, while another XML document 514 can store contact information for a business address book also owned by the user XUI-1 510a. When one of the XDMCs 106a-c requests access to any of the documents 512, an XCAP request is communicated to the XDMS 108 (FIGS. 1-4) with the request defining the path in the logical storage structure 500 indicating the document sought to be accessed. For example, a path 'http://[XCAP Root]/address-book/users/someuser/buddies/~/entry[5]' indicates the fifth 'entry' element instance in the document named 'buddies' (e.g., personal address book) belonging to 'someuser' under the 'address-book' application usage.

Figure 6:
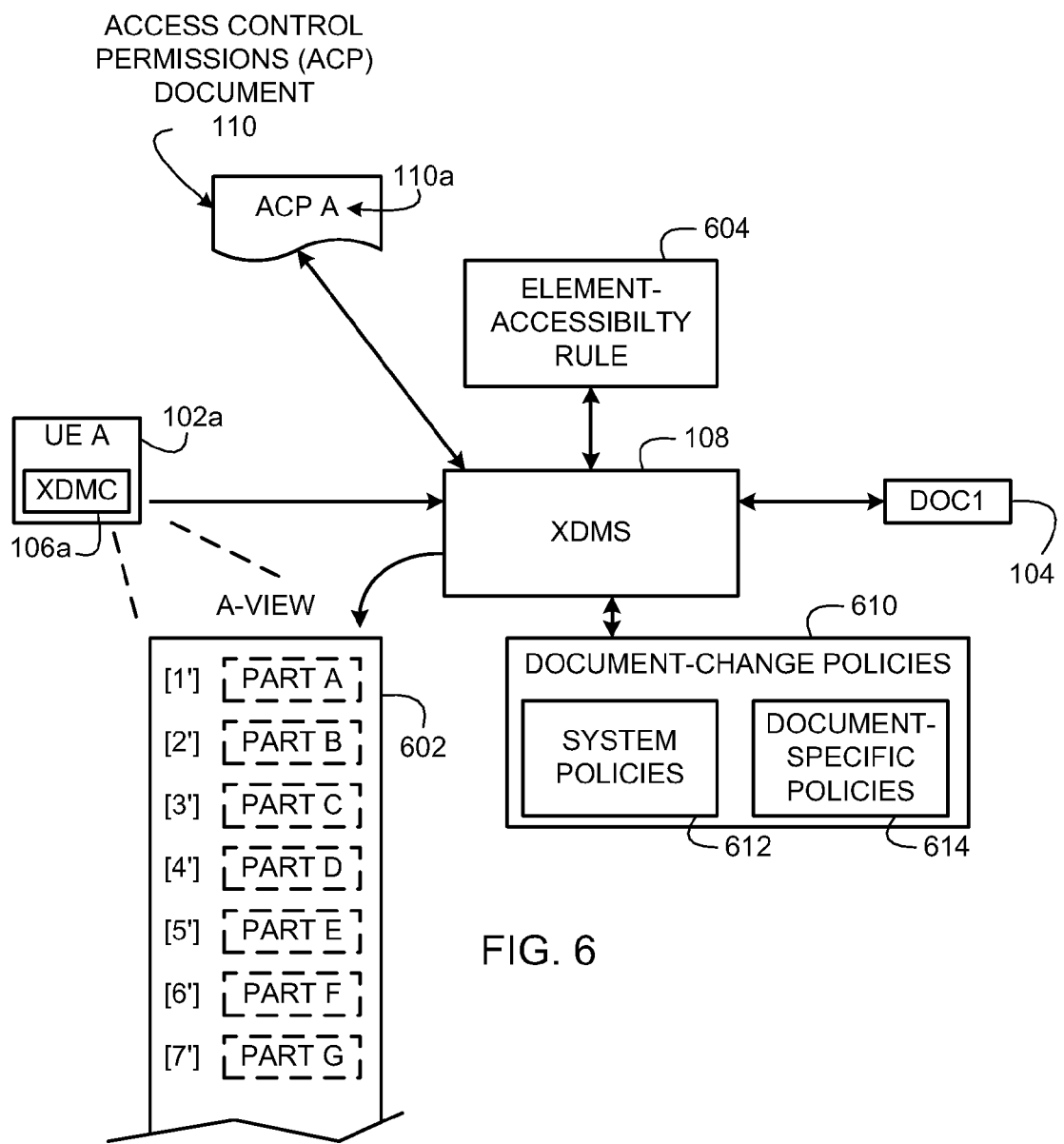
FIG. 6 depicts an example technique that can be used to maintain ordered relationships between server and client information using an element-accessibility rule and document-change policies.

FIG. 6 depicts an example technique that can be used to maintain ordered relationships between server and client information using a rules-based view-assembly process. In the illustrated example, upon receipt of an access request from the XDMC 106a, the XDMS 108 retrieves instances of attributes or elements from the XML document 104 that the XDMC 106a is authorized to access based on the ACP A 110a (FIG. 1) and generates a view 602. To ensure that the view 602 is a valid XML document (e.g., ensure that the XML document is structured in accordance with XML coding formats or standards), the XDMS 108 is provided with an element-accessibility rule 604. The element-accessibility rule 604 specifies that if an element instance in a sequence is accessible then all element instances of that sequence must be accessible and that if an element instance of a sequence is restricted, then all element instances of the same sequence must be restricted. In this manner, client views (e.g., the view 602) including a particular sequence of element instances can be assembled to show the correct positional indices for the element instances of that sequence relative to the indices of the server document (e.g., the server document indices 114 of FIG. 1).

In the illustrated example, a single element sequence is shown that includes the element instances PART A-PART G. Thus, for the view 602 to comply with the element-accessibility rule 604, the element instances (PART A-PART G) must be either all accessible to a requesting XDMC or all restricted for the requesting XDMC. In other example implementations, an ACP of a document having more than one element sequence would comply with the element-accessibility rule 604 if for each of the sequences, all of the element instances in that sequence were treated with the same accessibility regardless of how element instances of other sequences in the same document were treated. Thus, a complying view of that document may include one sequence with access provided to all of its element instances, while another sequence of the same document may have access restricted for all of its element instances.

A view of a document can be affected after the ACPs for the document are modified. In the illustrated example, the XDMS 108 is configured to re-evaluate the element-accessibility rule 604 after a change in ACPs for the document to ensure that for each sequence in the document, all of its element instances are treated the same (e.g., all restricted or all accessible). For example, a request to update at least one ACP of an element in an element sequence may be rejected when the ACPs for every element of the element sequence are set to not retrievable prior to receiving the ACP change request and the ACP change request involves changing the ACP of the element to retrievable. However, the ACP change request may be accepted under such circumstances when, in response to accepting the request to update, the access control permissions of all of the plurality of elements are changed to retrievable. In addition, a request to update at least one ACP of an element in an element sequence may be rejected when the ACPs for every element of the element sequence are set to retrievable prior to receiving the ACP change request and the ACP change request involves changing the ACP of the element to not retrievable. However, the ACP change request may be accepted under such circumstances when, in response to accepting the request to update, the access control permissions of all of the plurality of elements are changed to not retrievable.

When a change in ACPs occurs, notifications can be sent to affected XDMCs informing them to re-retrieve their views. If there is a conflict between the proposed change to the ACPs and the element-accessibility rule 604 (e.g., the change does not treat all element instances of a sequence the same), the principal performing the update is notified of the conflict. For example, upon notification the principal that requested the ACPs change may choose not to commit the change. However, if the change is committed with additional changes to treat element instances of same sequences the same), then any principal whose view is affected is notified to update their views.

An example manner of automating actions taken by principals affected by ACP changes is through the use of document-change policies 610. A policy can be implemented as a system-wide policy or a per-document policy. In the illustrated example, the document-change policies 610 include system policies 612 for system-wide policies that are generally applicable to all documents managed by a particular XDMS (e.g., the XDMS 108) and document-specific policies 614 for document-specific policies that are specifically applicable to particular respective documents (e.g., the XML document 104). In some example implementations, a system-wide policy can be used by default but be overridden under defined conditions by an overriding per-document policy. An example policy may be to unconditionally accept ACP changes and for each sequence, treat all of its element instances the same. Another example policy may be to reject ACP changes and notify the principal that attempted the update. Yet another example policy may be to queue up the ACP change until the admin principal resolves any issues, and while the change is queued up notify the principal that attempted the update that the update is still pending. Example processes of applying the element-accessibility rule 604 and the document-change policies 610 of FIG. 6 are described below in connection with the example flow diagrams of FIGS. 14 and 15.

Figure 7:
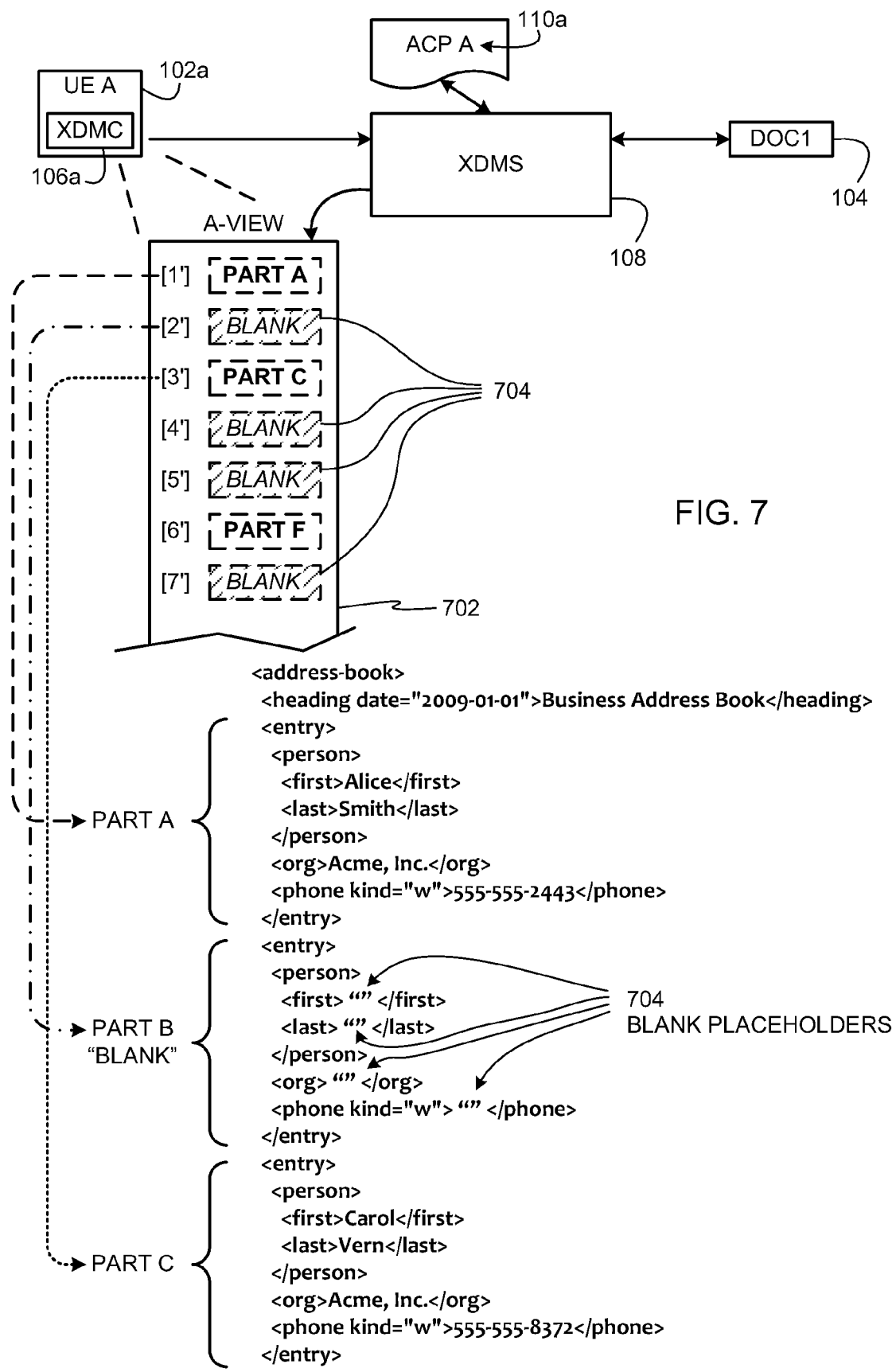
FIG. 7 depicts another example technique that can be used to maintain ordered relationships between server and client information using blank placeholders in non-accessible document portions.

FIG. 7 depicts another example technique that can be used to maintain ordered relationships between server and client information by using blank placeholders in assembled views to take the place of document portions (e.g., element instances) that requesting users are not authorized to access. In the illustrated example, upon receipt of an access request from the XDMC 106a, the XDMS 108 retrieves instances of attributes or elements (e.g., a group of attributes or elements) from the XML document 104 that the XDMC 106a is authorized to access based on the ACP A 110a (FIG. 1) and generates a view 702. To ensure that the view 702 is a valid XML document and that there is a 1:1 correspondence between client view indices and server document indices, the XDMS 108 inserts blank placeholders 704 for any attribute or element instance (e.g., a group of attributes or elements) that the XDMC 106a is not authorized to access. As shown in FIG. 7, the XDMC 106a is authorized to access PART A [1'], PART C [3'], and PART F [6'] of the XML document 104, but it is not authorized to access PART B [2'], PART D [4'], PART E [5'], and PART G [7']. The blank placeholders 704 are shown by way of example in FIG. 7 as empty element instances in PART B of the view 702 (i.e., <first>""</first>, <last>""</last>, etc.).

The XDMS 108 can use the blank placeholders 704 to ensure that it assembles client views with view indices (e.g., the view indices 206 of FIG. 2) that are the same as corresponding server document indices (e.g., the server document indices 114 of FIG. 1). Although the blank placeholders 704 appear as blank (i.e., no information) in the illustrated example of FIG. 7, in other example implementations, the blank placeholders 704 may be provided with pre-defined values (e.g., restrict codes) indicating a restriction or restricted access to the information in the elements corresponding to the blank placeholders 704. An example process of using the blank placeholders 704 is described below in connection with the example flow diagram of FIG. 16.

Figure 8:
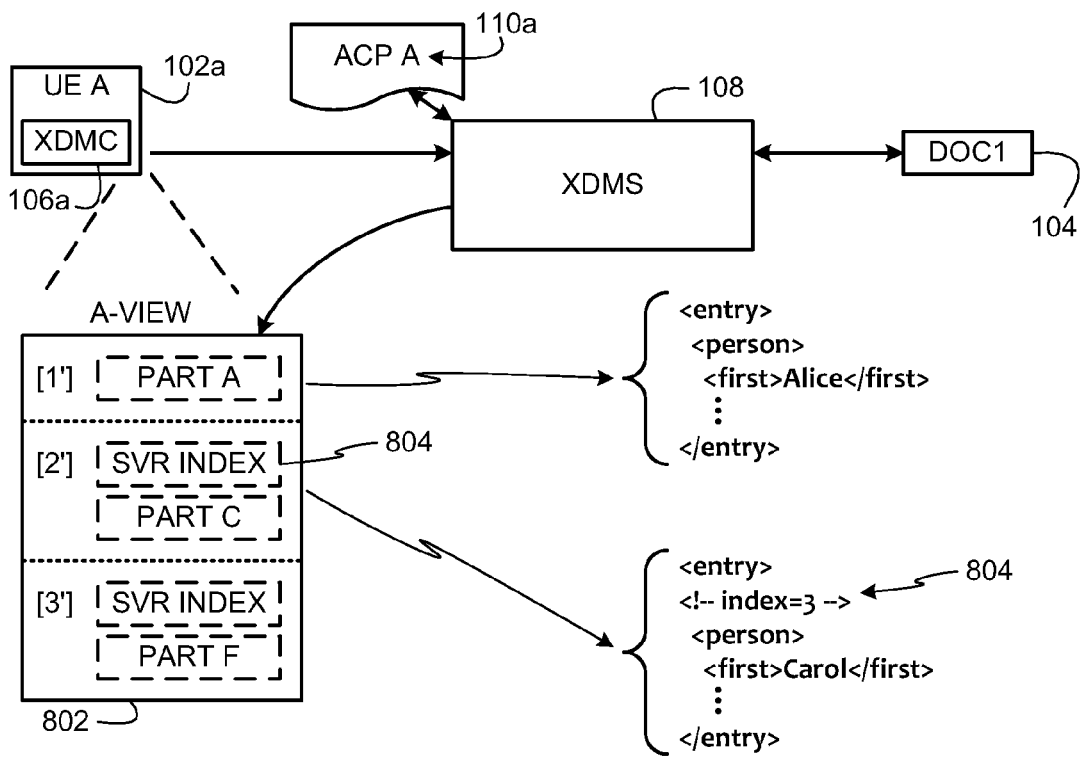
FIG. 8 depicts another example technique that can be used to maintain ordered relationships between server and client information using in-line server-client index mapping information in a client view.
Figure 9:
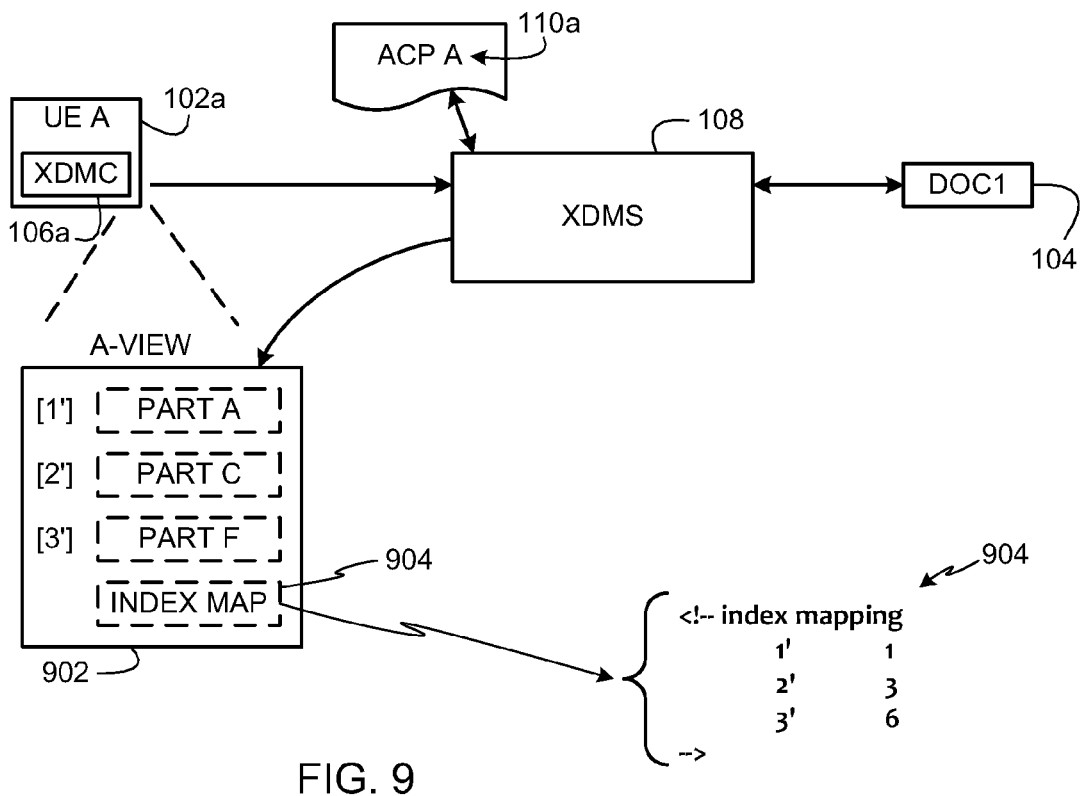
FIG. 9 depicts another example technique that can be used to maintain ordered relationships between server and client information using end-of-file server-client index mapping information in a client view.
Figure 10:
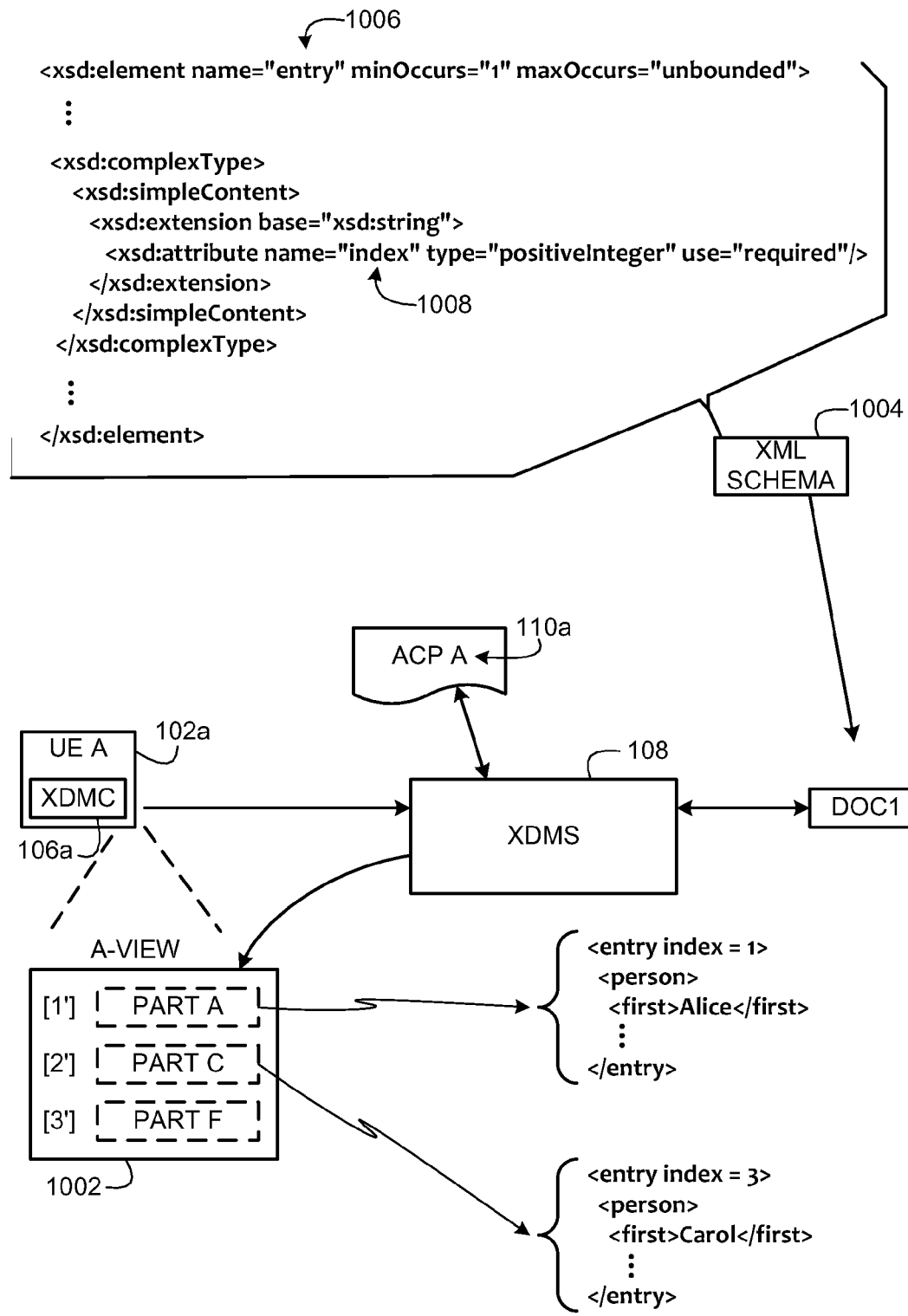
FIG. 10 depicts another example technique that can be used to maintain ordered relationships between server and client information using schema-defined attributes to indicate server index information in a client view.

FIGS. 8-10 depict example techniques that can be used to maintain ordered relationships between server and client information using server-client index mapping information in client views. In particular, the example technique of FIG. 8 uses in-line server-client index mapping information, the example technique of FIG. 9 uses end-of-file server-client index mapping information, and the example technique of FIG. 10 uses attribute-based server-client index mapping information. While generating a client view (e.g., a view 802 of FIG. 8, 902 of FIG. 9, or 1002 of FIG. 10) for a requesting XDMC (e.g., the XDMC 106*a*), for each element instance of a sequence with a view index (e.g., one of the view indices 206 of FIG. 2) different from a corresponding server document index (e.g., a corresponding one of the server document indices 114 of FIGS. 1 and 2), the XDMS 108 can provide the server document index (e.g., a unique index value) in the view or subset so that the requesting XDMC can use it to update the server version of the document.

Referring to FIG. 8, the illustrated example technique of providing server document indices (e.g., the server document indices 114 of FIGS. 1 and 2) involves writing the server document index in an XML comment within each element instance of a sequence. In the illustrated example, a server document index for PART C is shown as server index 804 to indicate that the server document index at the XDMS 108 is index [3] even though the client view index for PART C in the view 802 is shown as index [2']. An example format for including the server document index in the PART C element instance is shown as an XML comment in the form <!-index=3->. If an element instance does not have a commented server index as shown for PART A, the XDMC 106*a* is configured to interpret the client view index (e.g., the client index [1']) as the server document index (e.g., the server document index [1]). Including the server document index in client views in this manner informs XDMCs of server indices relative to server documents managed by XDMSs so that the XDMCs can address the correct element instances based on those server indices when sending document change requests to the XDMSs. An example process of generating and using server indices similar to the server index 804 is described below in connection with the example flow diagram of FIG. 17.

Referring to FIG. 9, the illustrated example technique of providing server document indices (e.g., the server document indices 114 of FIGS. 1 and 2) involves writing an index mapping structure 904 at the end of the view 902. The index mapping structure 904 maps client view indices (e.g., the view indices [1'], [2'], and [3']) with corresponding server document indices (e.g., the server document indices [1], [2], and [3]). As shown, the client view indices for PART A, PART B, and PART C are [1'], [2'], and [3'], respectively, and the index mapping structure 904 shows that the client view index [1'] is mapped to the server document index [1], the client view index [2'] is mapped to the server document index [3], and the client view index [3'] is mapped to the server document index [6]. In the illustrated example, the index mapping structure 904 is shown as an XML comment. In this manner, XDMCs can be configured to read the end-of-file commented index mapping structure 904 to identify the server document indices for element instances for which the XDMCs request changes to be made. An example process of generating and using index mapping structures similar to the index mapping structure 904 is described below in connection with the example flow diagram of FIG. 17.

Referring to FIG. 10, the illustrated example technique of providing server document indices (e.g., the server document indices 114 of FIGS. 1 and 2) involves writing the server document index in an attribute of an element instance that is defined using an XML schema for a corresponding document. In the illustrated example of FIG. 10, an XML schema 1004 defines the structure of the XML document 104. As shown in the example XML schema 1004, an element named "entry" 1006 includes an attribute named "index" 1008. In the XML document 104, the "index" attribute 1008 is used to store the server document index (e.g., one of the server indices [1]-[7] of FIG. 1) of a corresponding element instance of the "entry" element 1006. In this manner, when the XDMS 108 generates the view 1002, each element instance in the view 1002 will have its corresponding server document index value that is retrievable by the XDMC 106*a*. For example, as shown in FIG. 10, the element instance PART A having client view index [1'] is shown as having an attribute value for "index" equal to 1 (i.e., "<entry index=1>" as shown) to indicate that PART A corresponds to server document index [1]. In addition, the element instance PART C having client view index [2'] is shown as having an attribute value for "index" equal to 3 (i.e., "<entry index=3>" as shown) to indicate that PART C corresponds to server document index [3]. When the XDMC 106*a* submits a change request to the XDMS 108, it can determine the server document index based on the "index" attribute in the view 1002 of the element instance sought to be changed.

Using this example technique of FIG. 10, any time a new "entry" element instance is created in the XML document 104, its value for the "index" attribute is set to its corresponding server document index. In addition, when an existing "entry" element instance is deleted, the values for the "index" attributes of the remaining element instances are updated to reflect the re-sequenced server document indices after the element instance was deleted. An example process using attribute-based server-client index mapping information is described below in connection with the example flow diagram of FIG. 17.

Figure 11:
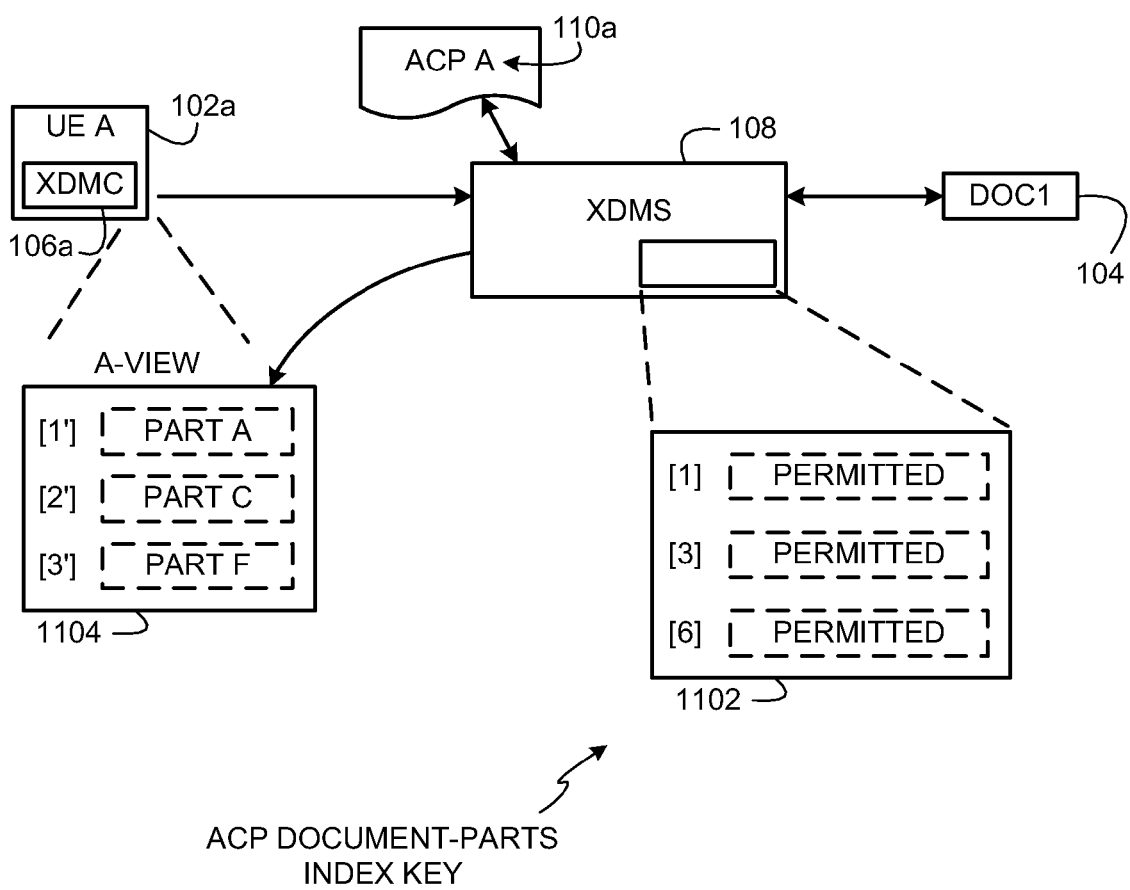
FIG. 11 depicts another example technique that can be used to maintain ordered relationships between server and client information using an access control permissions (ACP) document-parts index key in a document server.

FIG. 11 depicts another example technique that can be used to maintain ordered relationships between server and client information using an access control permission (ACP) document-parts index key 1102 in the XDMS 108. When the XDMC 106*a* requests access to the XML document 104, the XDMS 108 retrieves parts of the document 104 for which the XDMC 106*a* has access permissions based on a corresponding ACP (e.g., the ACP A 110*a* of FIG. 1) and assembles the view 904. In the illustrated example, the XDMC 106*a* is not made aware of any differences between the indices of the view 904 (i.e., the client view indices [1'], [2'], [3']) and the server document indices of the XML document 104 (i.e., the server document indices [1], [2], [3], [4], [5], [6], etc.). When the XDMC 106*a* requests to update the XML document 104, the XDMC 106*a* provides a target address for the requested change based on the client view indices ([1'], [2'], [3']) stored in the view 904. The XDMS 108 is configured to map the supplied view index (e.g., one of the client view indices [1'], [2'], [3'] communicated by the XDMC 106*a*) to a server document index (e.g., a corresponding one of the server document indices [1], [2], [3], [4], [5], [6], etc.) by counting only the elements of the particular sequence associated with change request that are accessible to the XDMC 106*a* based on a corresponding ACP (e.g., the ACP A 110*a* of FIG. 1). In this manner, the XDMS 108 can identify a correct one of the element instances of the XML document 104 that the XDMC 106*a* is requesting to change before committing the change to the document 104.

To identify a correct server document index, the XDMS 108 is configured to count element instances arranged in ascending order in the ACP document-parts index key 1102 that are accessible to the XDMC 106*a* until the count reaches the client view index value provided by the XDMC 106*a*. For example, if the XDMC 106*a* communicates the client view index value of [3'] to the XDMS 108 along with a change request, the XDMS 108 counts the first three ascending-ordered instance elements in the ACP document-parts index key 1102 to which the XDMC 106*a* has access. In the illustrated example, the parts of the document 104 to which the XDMC 106a has access are denoted as 'PERMITTED' in the ACP document-parts index key 1102. Thus, in the illustrated example of FIG. 11, the first element instance to which the XDMC 106a has access corresponds to server document index [1], the second element instance to which the XDMC 106a has access corresponds to server document index [3], and the third element instance to which the XDMC 106a has access corresponds to server document index [6]. Therefore, if the XDMC 106a communicates the client view index value of [3'] to the XDMS 108, the XDMS 108 determines that the element instance referred to by the XDMC 106a corresponds to the server document index [6] (i.e., PART F of the XML document 104) because the server document index [6] is the third permitted element instance noted in the ascending-ordered indices of the ACP document-parts index key 1102. An example process of generating and using the ACP document-parts index key 1102 is described below in connection with FIG. 18.

Figure 12:
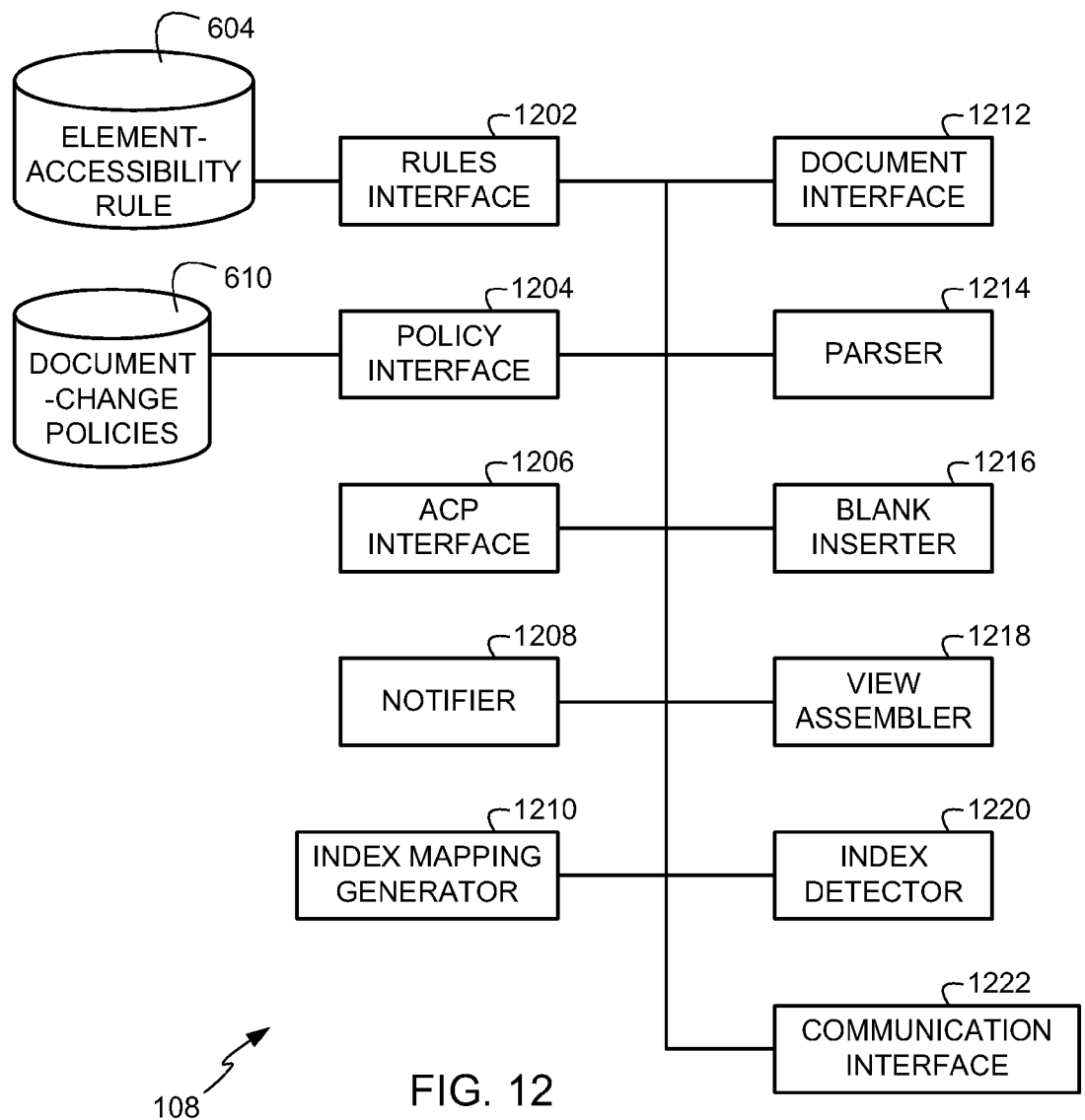
FIG. 12 depicts an example apparatus that can be used to implement a document server to maintain ordered relationships between server and client information.
Figure 13:
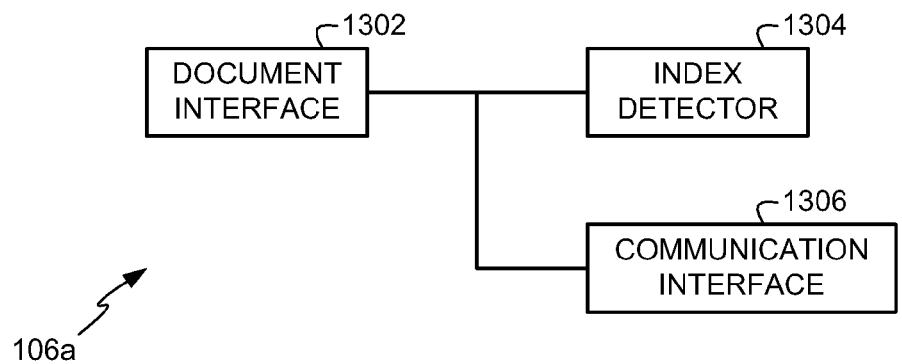
FIG. 13 depicts an example apparatus that can be used to implement a client to maintain ordered relationships between server and client information.

FIG. 12 depicts an example apparatus that can be used to implement the example XDMS 108 (FIGS. 1-4 and 6-11), and FIG. 13 depicts an example apparatus that can be used to implement the XDMC 106a (FIGS. 1-3 and 6-11) to maintain ordered relationships between server information (e.g., the XML document 104 of FIGS. 1-3 and 5-11) and client information (e.g., the views 202 and 204 (FIG. 2), 602 (FIG. 6), 702 (FIG. 7), 802 (FIG. 8), 902 (FIG. 9), 1002 (FIG. 10), and 1104 (FIG. 11)). The example apparatus of FIG. 13 can similarly be used to implement the XDMCs 106b and 106c. In the illustrated example of FIG. 12, the example XDMS 108 includes a rules interface 1202, a policy interface 1204, an ACP interface 1206, a notifier 1208, an index mapping generator 1210, a document interface 1212, a parser 1214, a blank inserter 1216, a view assembler 1218, an index detector 1220, and a communication interface 1222. In the illustrated example of FIG. 13, the XDMC 106a includes a document interface 1302, an index detector 1304, and a communication interface 1306.

Each of the example XDMS 108 and the XDMC 106a may be implemented using any desired combination of hardware, firmware, and/or software. For example, one or more integrated circuits, discrete semiconductor components, and/or passive electronic components may be used. Thus, for example, any of the rules interface 1202, the policy interface 1204, the ACP interface 1206, the notifier 1208, the index mapping generator 1210, the document interfaces 1212 and 1302, the parser 1214, the blank inserter 1216, the view assembler 1218, the index detectors 1220 and 1304, and/or the communication interfaces 1222 and 1306, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 20:
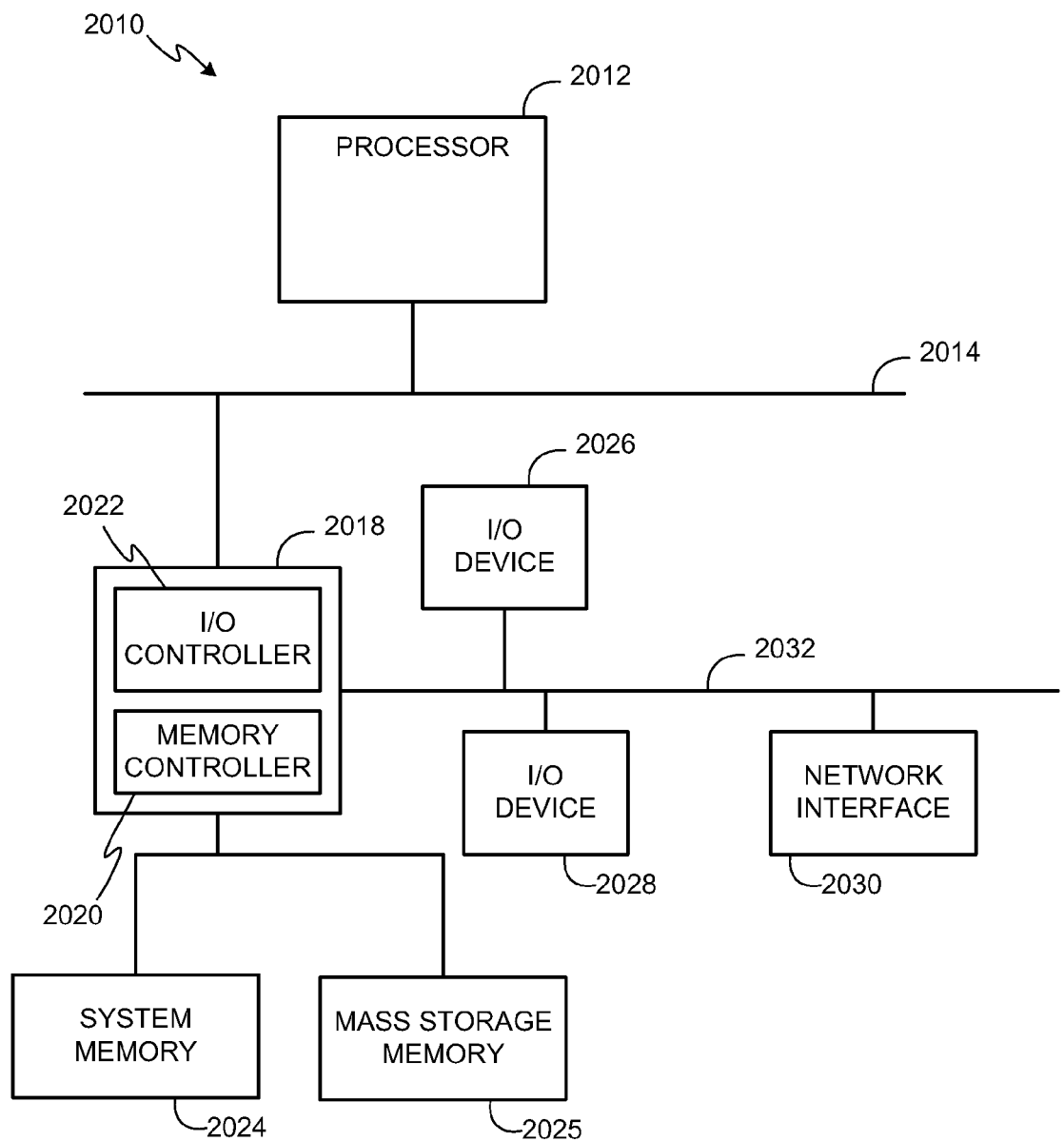
FIG. 20 is an example processor system that can be used to implement the example methods and apparatus disclosed herein.

Some or all of the rules interface 1202, the policy interface 1204, the ACP interface 1206, the notifier 1208, the index mapping generator 1210, the document interfaces 1212 and 1302, the parser 1214, the blank inserter 1216, the view assembler 1218, the index detectors 1220 and 1304, and/or the communication interfaces 1222 and 1306, or parts thereof, may be implemented using instructions, code, and/or other software and/or firmware, etc. stored on a machine accessible medium and executable by, for example, a processor system (e.g., the example processor system 2010 of FIG. 20). In some implementations, at least one of the rules interface 1202, the policy interface 1204, the ACP interface 1206, the notifier 1208, the index mapping generator 1210, the document interfaces 1212 and 1302, the parser 1214, the blank inserter 1216, the view assembler 1218, the index detectors 1220 and 1304, and/or the communication interfaces 1222 and 1306 may be configured to include or otherwise use a tangible medium such as a memory, DVD, CD, etc.

Now turning in detail to FIG. 12, to access the element-accessibility rule 604 (FIG. 6), the XDMS 108 is provided with the rules interface 1202. To access the document-change policies 610 (FIG. 6), the XDMS 108 is provided with the policy interface 1204. To access ACPs (e.g., the ACPs A-C 110a-c of FIG. 1), the XDMS 108 is provided with the ACP interface 1206. To generate and forward notifications to users or principals informing of document changes that would affect client views of those principals or of documents owned by those principals, the XDMS 108 is provided with the notifier 1208. To generate client-server document index mappings (e.g., the server index 804 of FIG. 8 and the index mapping structure 904 of FIG. 9, and the attribute-based server-client mapping information of FIG. 10), the XDMS 108 is provided with the index mapping generator 1210. To create, retrieve, and/or modify documents (e.g., the XML document 104 of FIGS. 1-3 and 5-11), the XDMS 108 is provided with the document interface 1212.

To retrieve parts (e.g., instances of elements or attributes) from a document, the XDMS 108 is provided with the parser 1214. For example, the parser 1214 can retrieve parts for which an XDMC requesting access is authorized to access based on a corresponding ACP (e.g., the ACPs A-B 110a-c of FIG. 1). The retrieved parts can then be used to assemble a view or subset (e.g., the views 602 of FIG. 6, 702 of FIG. 7, 802 of FIG. 8, 902 of FIG. 9, 1002 of FIG. 10, and 1104 of FIG. 11) for the requesting XDMC. To insert blank placeholders (e.g., the blank placeholders 704 of FIG. 7) in views or subsets (e.g., the view 702 of FIG. 7) as discussed above in connection with FIG. 7, the XDMS 108 is provided with a blank inserter 1216.

To assemble views or subsets (e.g., the views 602 of FIG. 6 and 702 of FIG. 7) of documents (e.g., the XML document 104), the XDMS 108 is provided with the view assembler 1218. For example, when the XDMC 106a submits an information access request to view one or more parts of the XML document 104, the view assembler 1218 can assemble the view 602 corresponding to the XDMC 106a based on the access permissions in the ACP A 110a corresponding to the XDMC 106a and also based on ones of the element-accessibility rule 604 associated with the XML document 104.

To detect server document indices (e.g., the server document indices 114 of FIG. 1) based on client view indices (e.g., the view indices 206 of FIG. 2) communicated by an XDMC as discussed above in connection with FIG. 11, the XDMS 108 is provided with the index detector 1220. The index detector 1220 is configured to count ascending-ordered element instances that are accessible to a requesting XDMC until the count reaches the client view index value provided by the XDMC as discussed above in connection with FIG. 11.

To communicate with XDMCs or other XDMSs, the XDMS 108 is provided with a communication interface 1222. For example, the XDMS 108 can receive information request messages and document change requests from XDMCs via the communication interface 1222. In addition, the XDMS 108 can communicate responses or notifications to XDMCs via the communication interface 1222.

Turning now to FIG. 13, the XDMC 106a is provided with the document interface 1302 to access client views (e.g., the views 602 of FIG. 6, 702 of FIG. 7, 802 of FIG. 8, 902 of FIG. 9, 1002 of FIG. 10, and 1104 of FIG. 11) received from the XDMS 108. To read server document index values (e.g., the server document indices 114 of FIG. 1) stored in client views received from the XDMS 108 as discussed above in connection with FIGS. 8-10, the XDMC 106*a* is provided with the index detector 1304. For example, the index detector 1304 can be configured to search XML comments of views to find in-line server document indices (e.g., the server index 804 of FIG. 8) or end-of-file server document indices (e.g., the index mapping structure 904 of FIG. 9). In addition, the index detector 1304 can be configured to identify attribute-based server-client information (e.g., "<entry index=1>" as shown in FIG. 10) in client views as discussed above in connection with FIG. 10. To communicate with the XDMS 108, the XDMC 106*a* is provided with the communication interface 1306.

FIGS. 14-19 depict example flow diagrams representative of processes that may be implemented using, for example, computer readable instructions that may be executed to maintain ordered relationships between server and client information as described herein. The example processes of FIGS. 14-19 may be performed using a processor, a controller and/or any other suitable processing device. For example, the example processes of FIGS. 14-19 may be implemented using coded instructions stored on a tangible medium such as a flash memory, a read-only memory (ROM) and/or a random-access memory (RAM) associated with a processor (e.g., the processor 2012 of FIG. 20). Alternatively, some or all of the example processes of FIGS. 14-19 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 14-19 may be implemented manually or as any combination(s) of any of the foregoing techniques, for example, any combination of firmware, software, discrete logic and/or hardware. Further, although the example processes of FIGS. 14-19 are described with reference to the flow diagrams of FIGS. 14-19, other methods of implementing the processes of FIGS. 14-19 may be employed. For example, the order of execution of the blocks may be changed, and/or some of the blocks described may be changed, eliminated, sub-divided, or combined. Additionally, any or all of the example processes of FIGS. 14-19 may be performed sequentially and/or in parallel by, for example, separate processing threads, processors, devices, discrete logic, circuits, etc.

The example processes of FIGS. 14-19 are described as executed by the XDMS 108 and the XDMCs 106*a-c* of FIGS. 1-4 and 6-13. As discussed above in connection with FIG. 4, the XDMS 108 can be a collection of different XDMSs, each of which manages documents associated with a respective type of information (e.g., the shared profile XDMS 416*a*, the shared list XDMS 416*b*, the shared policy XDMS 416*c*, and the shared group XDMS 416*d*). Alternatively, the XDMS 108 can be a single type of XDMS that manages a single type of document (e.g., the XDMS 108 could implement the shared profile XDMS 416*a*, alone). In any case, although the example processes of FIGS. 14-19 are described below in connection with the XDMS 108, other XDMSs can be adapted to similarly execute the example processes.

Figure 14:
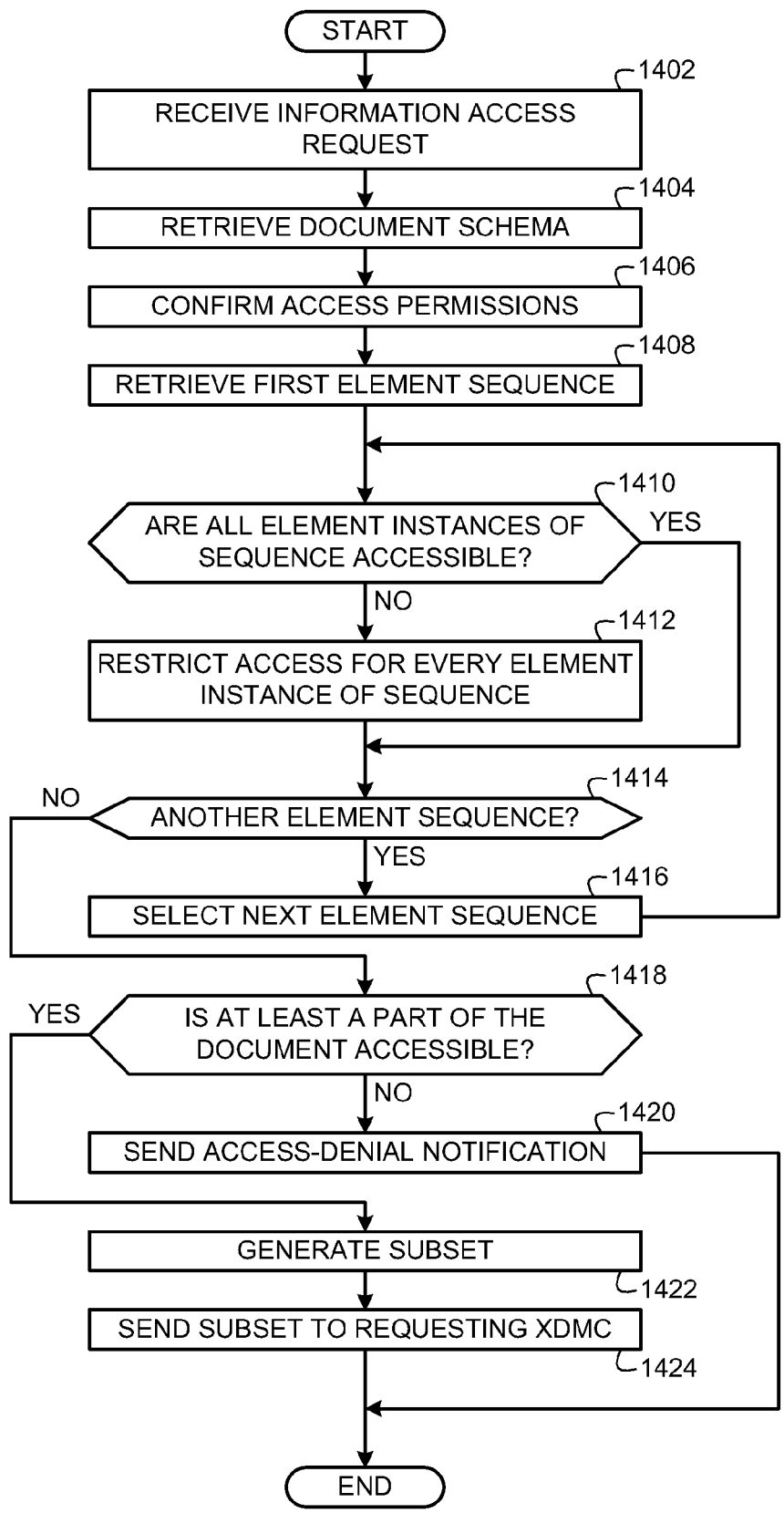
FIG. 14 is an example flow diagram representative of a process that may be executed to assemble different views for different clients based on access control permissions and the element-accessibility rule of FIG. 6.

FIG. 14 is an example flow diagram representative of a process that may be executed to assemble different views for different XDMCs (e.g., the XDMCs 106*a-c* of FIGS. 1-3) based on ACPs (e.g., the ACPs 110*a-c* of FIG. 1) and the element-accessibility rule 604 of FIG. 6. Initially, the communication interface 1222 (FIG. 12) receives an information access request (block 1402) from an XDMC (e.g., the XDMC 106*a* of FIGS. 6 and 13). In the illustrated example, the information access request is a request to view a particular document such as the XML document 104 of FIGS. 1, 2, 5, and 6. The document interface 1212 (FIG. 12) retrieves the document schema (e.g., an XML schema) for the XML document 104 (block 1404), and the ACP interface 1206 confirms the access permissions (e.g., the ACP A 110*a* of FIG. 1) associated with the document 104 for the XDMC 106*a* (block 1406). For example, the access permissions defined in the ACP A 110*a* indicate the information that the principal associated with the XDMC 106*a* can access in the particular XML document 104.

The parser 1214 (FIG. 12) retrieves a first element sequence having a requested document part (block 1408) from the document 104. For example, if the XDMC 106*a* requested to view one of the address entries corresponding to the element instances 112 of FIG. 1, the parser 1214 retrieves the sequence of indices [1]-[7] 114 shown in FIG. 1. The rules interface 1202 then determines whether all of the element instances (e.g., the element instances represented by PARTS A-G in FIG. 1) are accessible to the XDMC 106*a* (block 1410). If not all of the element instances are accessible to the XDMC 106*a* (block 1410), the rules interface 1202 restricts access to every element instance in the sequence (block 1412). After restricting access to every element instance in the sequence (block 1412) or if all of the element instances are accessible to the XDMC 106*a* (block 1410), the parser 1214 determines whether there is another element sequence to analyze (block 1414). If there is another element sequence to analyze (block 1414), the parser 1214 selects a next element sequence (block 1416) and control returns to block 1410.

If at block 1414, the parser 1214 determines that there are no more element sequences to analyze, the view assembler 1218 (FIG. 12) determines whether any part of the document is accessible (block 1418). If no part of the document is available (block 1418), the notifier 1208 (FIG. 12) sends an access-denial notification to the XDMC 106*a* (block 1412). However, if at least one part of the document is available (block 1418), the view assembler 1218 generates the requested view or subset (e.g., the view 602 of FIG. 6) (block 1422), and the communication interface 1222 (FIG. 12) sends the view or subset to the XDMC 106*a* (block 1424). After the view or subset is sent (block 1424) or after the access-denial notification is sent (block 1420), the example process of FIG. 14 is ended.

Figure 15:
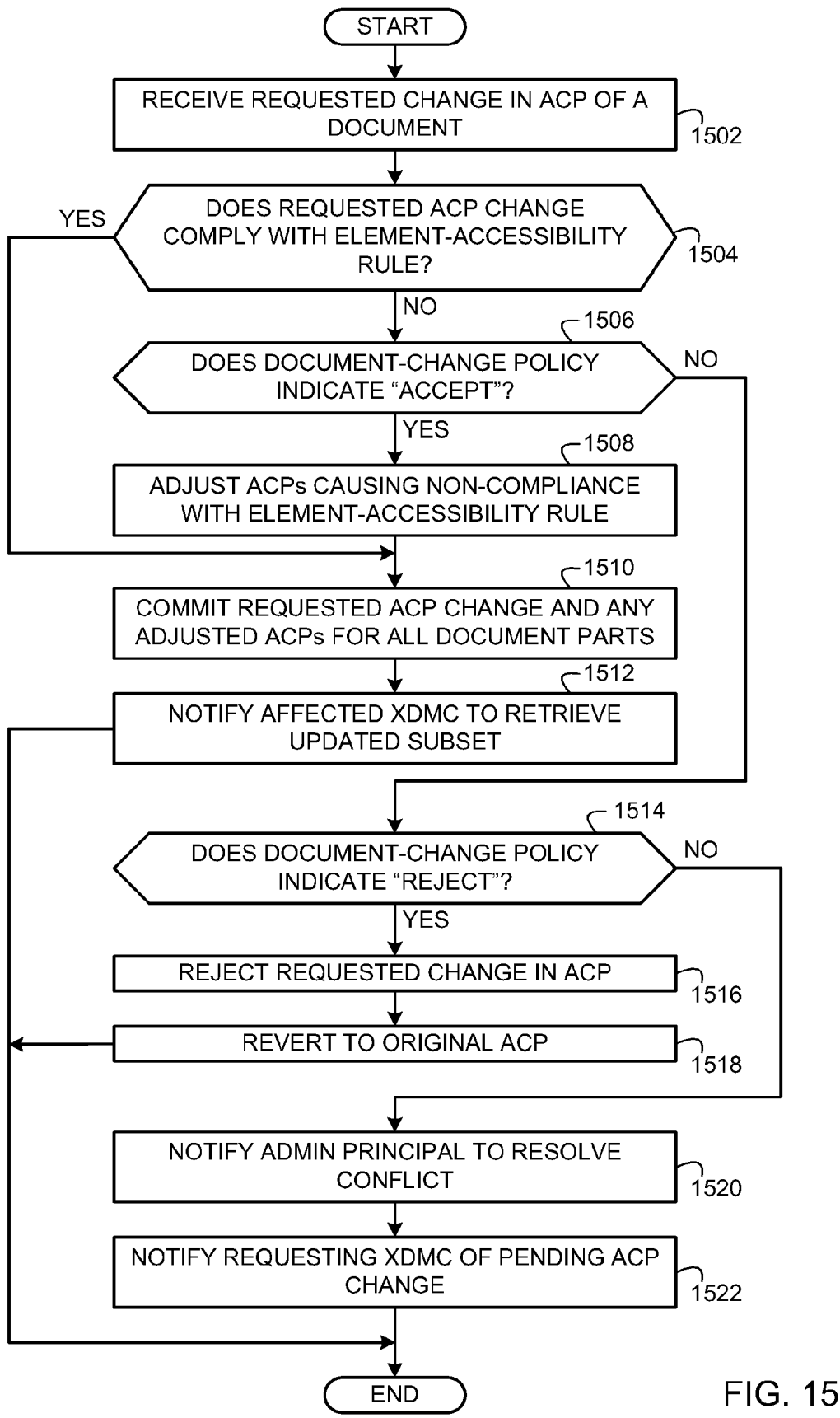
FIG. 15 is an example flow diagram representative of a process that may be executed to selectively allow changes to access control permissions associated with a document based on the element-accessibility rule and document-change policies of FIG. 6.

FIG. 15 is an example flow diagram representative of a process that may be executed to allow changes to access control permissions (e.g., the ACPs 110*a-c* of FIG. 1) associated with a document (e.g., the XML document 104 of FIGS. 1, 2, 5, and 6) based on the element-accessibility rule 604 (FIGS. 6 and 12) and the document-change policies 610 (FIGS. 6 and 12). Initially, the ACP interface 1206 (FIG. 12) receives a change in access control permissions (e.g., the ACP A 110*a* of FIG. 1) for a document (e.g., the XML document 104) (block 1502). For example, the ACP change may be made by the admin principal of the XML document 104 to change access permissions for the principal corresponding to the XDMC 106*a* (FIGS. 1-3 and 6). In response to receiving the change, the rules interface 1202 determines whether the requested ACP change complies with the element-accessibility rule 604 of the document 104 (block 1504). In the illustrated example, the ACP change request complies with the element-accessibility rule 604 if the ACP change does not treat the accessibility of element instances within an element sequence differently. That is, for each element sequence, the ACP change request must treat all of the element instances in that sequence as either all restricted or all accessible. If the requested ACP change does not comply with the element-accessibility rule 604 (block 1504), the policy interface 1204 (FIG. 12) determines whether the document-change policies 610 (FIGS. 6 and 12) for the XML document 104 indicate that the requested ACP change (received at block 1502) should be accepted (block 1506) even though it does not comply with the element-accessibility rule 604. If the requested ACP change should be accepted (block 1506), the ACP interface 1206 adjusts one or more ACPs causing non-compliance with the element-accessibility rule 604 (block 1508). For example, if an ACP previously indicated that all element instances of a particular sequence were inaccessible, and the requested ACP change received at block 1502 changes permissions of one of those element instances to be accessible, at block 1510 the ACP interface 1206 changes permissions of all of the element instances of that sequence to be accessible.

After the ACP interface 1206 adjusts ACPs at block 1508 or if the rules interface 1202 determines that the requested ACP change complies with the element-accessibility rule 604 (block 1504), the ACP interface 1206 commits the requested ACP change and any adjusted ACPs to the corresponding ACP for the document 104 (block 1510). In addition, the notifier 1208 (FIG. 12) notifies the affected XDMC (e.g., the XDMC 106a) to retrieve an updated client view or subset of the document 104 (block 1512).

Returning to block 1506, if the document-change policies 610 for the XML document 104 do not indicate that the ACP change should be accepted (block 1506), control advances to block 1514 at which the policy interface 1204 determines whether the document-change policies 610 for the XML document 104 indicate that the requested ACP change should be rejected (block 1514). If the requested ACP change should be rejected (block 1514), the ACP interface 1206 rejects the requested ACP change (block 1516), and the ACP A 110a reverts to the server ACP without committing the changes (block 1518). However, if at block 1514, the policy interface 1204 determines that the document-change policies 610 do not indicate that the requested ACP change should be rejected (block 1514), the notifier 1208 (FIG. 12) notifies the admin principle of the document 104 to resolve the conflict arising from the requested ACP change (block 1520). In addition, the notifier 1208 notifies the XDMC 106a that the requested ACP change is pending (block 1522). In the illustrated example, the requested ACP change will remain pending until the admin principal resolves the conflict or until a predetermined duration has lapsed, at which point the requested ACP change will be automatically rejected.

After the XDMC 106a is notified of the pending ACP change (block 1522) or after the requested ACP change is reverted (block 1518) or after the XDMC 106a is notified to retrieve an updated view (block 1512), the example process of FIG. 15 ends.

Figure 16:
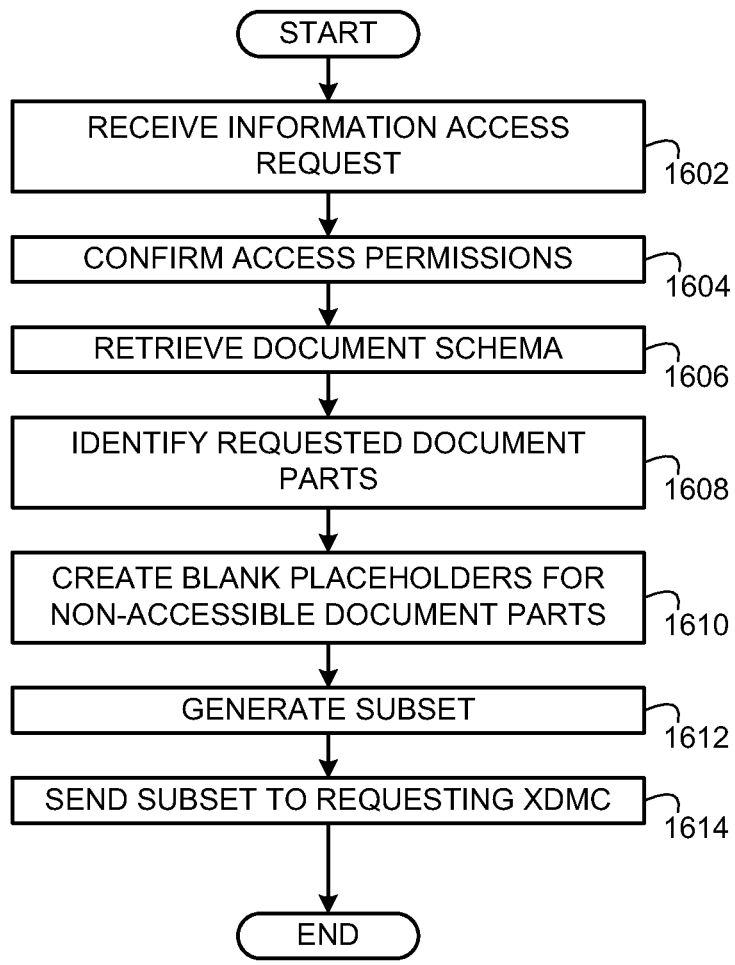
FIG. 16 is an example flow diagram representative of a process that may be executed to assemble different views for different clients based on access control permissions and the blank placeholders of FIG. 7.

FIG. 16 is an example flow diagram representative of a process that may be executed to assemble different views for different XDMCs based on access control permissions (e.g., the ACPs A-C 110a-c of FIG. 1) and the blank placeholders 704 of FIG. 7. Initially, the communication interface 1222 (FIG. 12) receives an information access request (block 1602). In the illustrated example, the information access request is received from the XDMC 106a to access information in the XML document 104. The ACP interface 1206 (FIG. 12) confirms the access control permissions (e.g., the ACP A 110a) for the requesting principal (block 1604). The document interface 1212 (FIG. 12) retrieves the document schema of the XML document 104 (block 1606) and identifies the requested parts of the XML document 104 (block 1608) based on the ACP A 110a and the retrieved schema. The blank inserter 1216 (FIG. 12) creates blank placeholders for the non-accessible document parts (block 1610). The view assembler 1218 (FIG. 12) generates a view or subset of the XML document 104 based on the information access request (block 1612) with the blank placeholders 704 at locations of the XML document 104 not accessible by the requesting principal as shown in the view 702 of FIG. 7. The communication interface 1222 sends the view or subset to the requesting XDMC 106a (block 1614), and the example process of FIG. 16 is ended.

Figure 17:
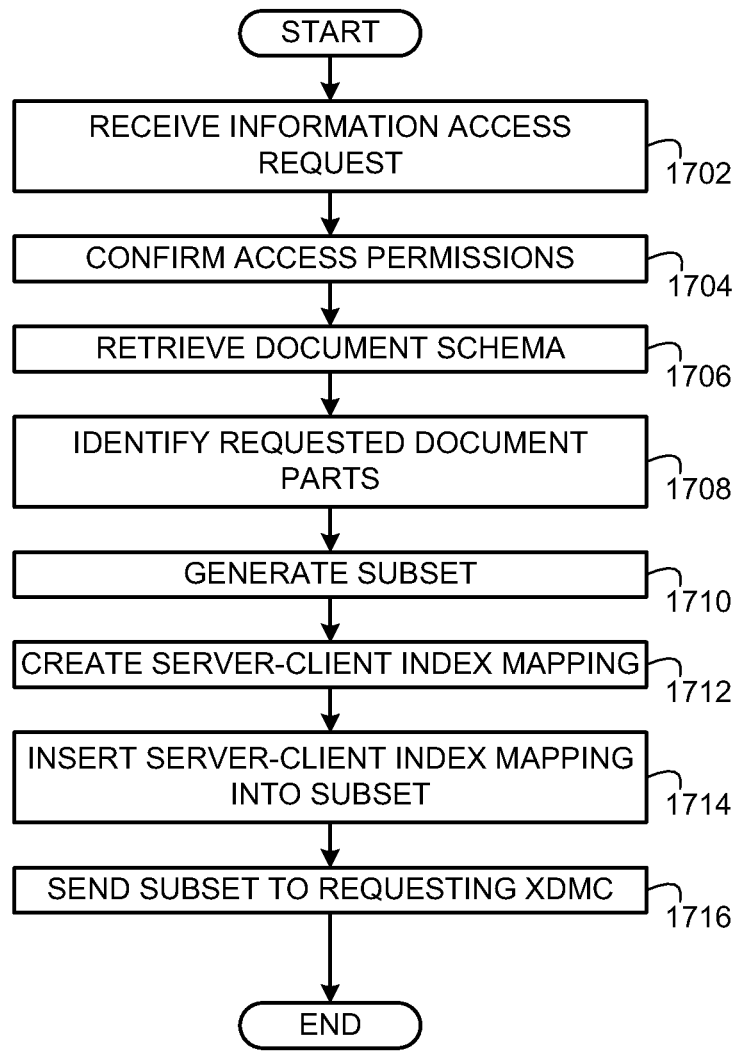
FIG. 17 is an example flow diagram representative of a process that may be executed to assemble views for different clients including the server-client index mapping information of FIGS. 8 and 9.

FIG. 17 is an example flow diagram representative of a process that may be executed to assemble different views for different XDMCs based on access control permissions (e.g., the ACPs A-C 110a-c of FIG. 1) and the server index 804 of FIG. 8, the index mapping structure 904 of FIG. 9, or the attribute-based server-client index mapping information of FIG. 10. Initially, the communication interface 1222 (FIG. 12) receives an information access request (block 1702). In the illustrated example, the information access request is received from the XDMC 106a to access information in the XML document 104. The ACP interface 1206 (FIG. 12) confirms the access control permissions (e.g., the ACP A 110a) for the requesting principal (block 1704). The document interface 1212 (FIG. 12) retrieves the document schema of the XML document 104 (block 1706) and identifies the requested parts of the XML document 104 (block 1708) based on the ACP A 110a and the retrieved schema. The view assembler 1218 (FIG. 12) generates a view or subset (e.g., the view 802 of FIG. 8, the view 902 of FIG. 9, or the view 1002 of FIG. 10) (block 1710).

The index mapping generator 1210 (FIG. 12) creates a server-client index mapping (block 1712). For example, the index mapping generator 1210 can generate server index indicators similar to the server index 804 of FIG. 8 that can be written in-line within corresponding element instances as described above in connection with FIG. 8. In other example implementations, the index mapping generator 1210 can generate an index mapping structure similar to the index mapping structure 904 of FIG. 9 that can be appended at the end of a view as discussed above in connection with FIG. 9. In yet other example implementations, the index mapping generator 1210 can retrieve the attribute-based server-client index mapping information of FIG. 10 (e.g., the value of the "index" attribute 1008 for each element instance) from the XML document 104 for including in a generated view.

The view assembler 1218 (FIG. 12) inserts the server-client index mapping information into the view or subset generated at block 1710 (block 1714). The communication interface 1222 sends the view or subset to the requesting XDMC 106a (block 1716), and the example process of FIG. 17 is ended.

Figure 18:
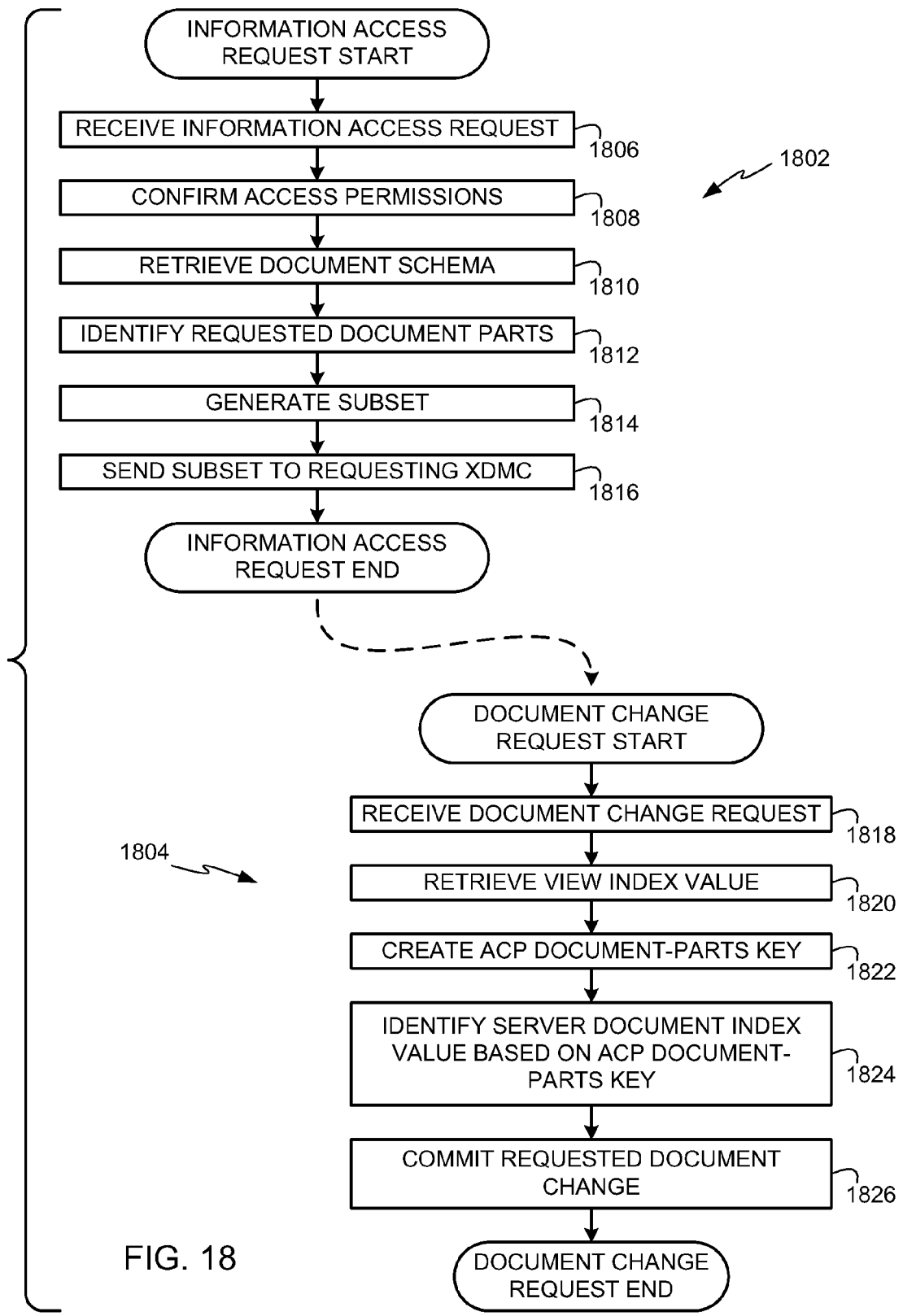
FIG. 18 depicts example flow diagrams representative of a process that may be executed to identify parts of a client view during a client change request operation using the access control permissions (ACP) document-parts key of FIG. 11.

FIG. 18 depicts example flow diagrams representative of a process that may be executed to assemble different views for different XDMCs based on access control permissions (e.g., the ACPs A-C 110a-c of FIG. 1) and identify parts client views during a client change request operation using the access control permissions (ACP) document-parts key 1102 of FIG. 11. The flow diagrams of FIG. 18 represent two example processes, an information access request process 1802 and a document change request process 1804, that can be executed by the XDMS 108. In particular, the XDMS 108 can execute the information access request process 1802 to assemble a client view (e.g., the client view 1104 of FIG. 11) based respective ACPs. In addition, the XDMS 108 can execute the document change request process 1804 to commit changes to the XML document 104 based on the ACP document parts key 1102.

In operation of the information access request process 1802, initially the communication interface 1222 (FIG. 12) receives an information access request (block 1806). In the illustrated example, the information access request is received from the XDMC 106a to access information in the XML document 104. The ACP interface 1206 (FIG. 12) confirms the access control permissions (e.g., the ACP A 110a) for the requesting principal (block 1808). The document interface 1212 (FIG. 12) retrieves the document schema of the XML document 104 (block 1810) and identifies the requested parts of the XML document 104 (block 1812) based on the ACP A 110a and the retrieved schema. The view assembler 1218 (FIG. 12) generates a view or subset (e.g., the view 1104 of FIG. 11) (block 1814). The communication interface 1222 sends the view or subset to the requesting XDMC 106a (block 1816). The information access request process 1802 then ends, and control is passed to the document change request process 1804 upon receipt of a document change request from the XDMC 106a.

Turning now to the document change request process 1804, the communication interface 1222 receives a document change request (block 1818) from the XDMC 106a, the index detector 1220 (FIG. 12) retrieves a view index value (e.g., one of the view index values [1'], [2'], [3'] 206 of FIG. 2) from the document change request (block 1820). The ACP interface 1206 creates the ACP document-parts index key 1102 (FIG. 11) (block 1822). For example, based on the element instances that the ACP A 110a indicates as accessible to the XDMC 106a, the ACP interface 1206 can tag each corresponding server document index (e.g., indices [1]-[7] of FIG. 11) with a 'PERMITTED' indicator in the ACP document-parts index key 1102 as shown in FIG. 11. In the illustrated example, the ACP interface 1206 stores the ACP document-parts index key 1102 at the XDMS 108 as shown in FIG. 11.

The index detector 1220 identifies a corresponding server document index value (e.g., one of the server document indices 114 of FIGS. 1 and 2) (block 1824) based on a count of element instances labeled as 'PERMITTED' in the ACP document-parts index key 1102 as discussed above in connection with FIG. 11. The document interface 1212 then commits the requested document change in the XML document 104 (block 1826) based on the server index value identified at block 1824. The document change request process 1804 is then ended.

Figure 19:
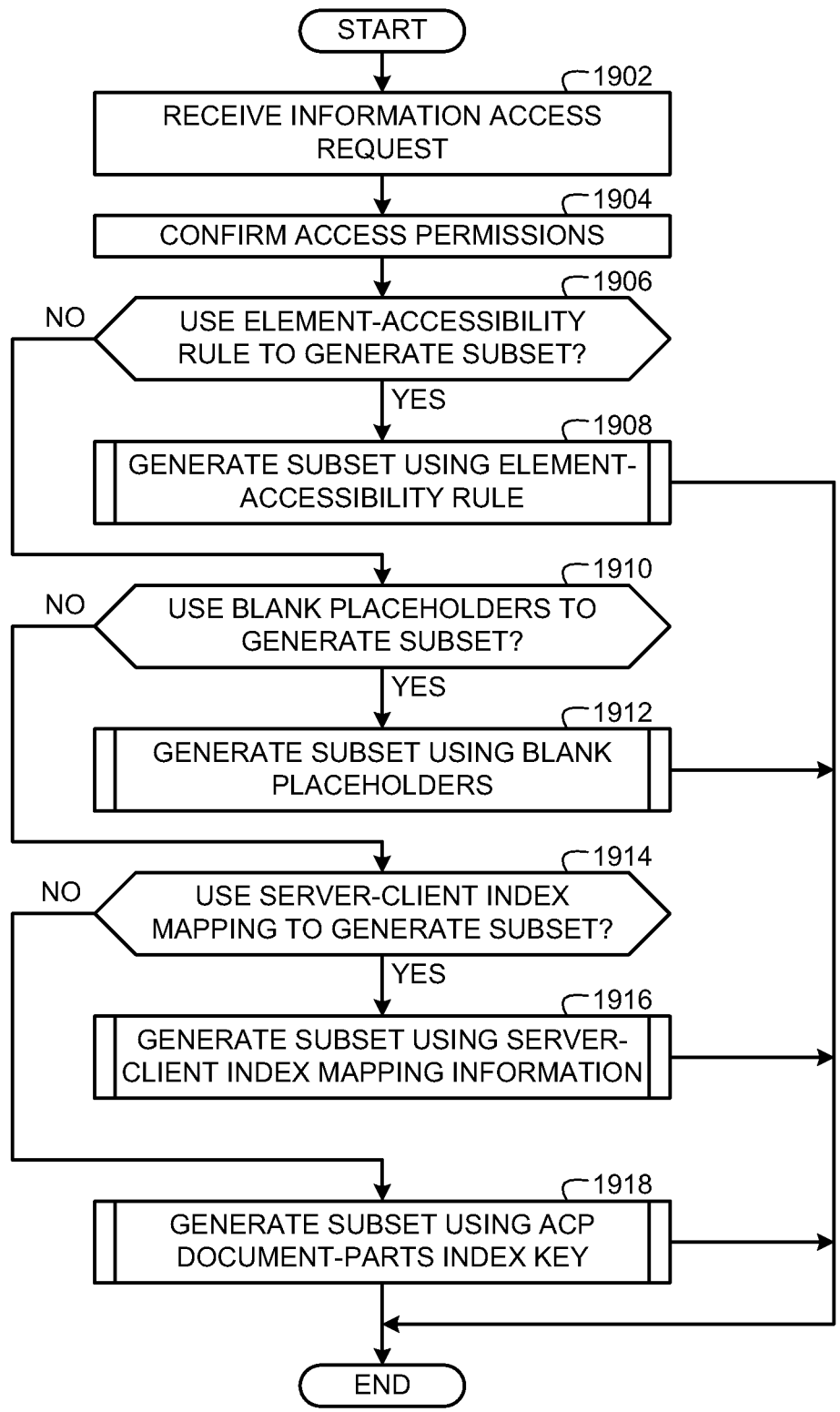
FIG. 19 is an example flow diagram representative of a process that may be used to assemble different views for different clients selectively based on the above example processes of FIGS. 14 and 16-18.

FIG. 19 is another example flow diagram representative of a process that may be used to assemble different views for different clients selectively based on any of the example processes discussed above in connection with FIGS. 14-18. The example process of FIG. 19 may be used for instances in which a particular one of the view assembly techniques is more efficient than the other. An admin principal can indicate which view assembly technique to use for a particular document (e.g., the XML document 104) by defining a view assembly technique indicator in the ACPs (e.g., the ACPs A-C 110a-c) corresponding to that document. In this manner, when access to the document is requested, the view assembly technique to be used can be retrieved from a corresponding ACP.

Turning in detail to FIG. 19, initially, the communication interface 1222 (FIG. 12) receives an information access request (block 1902). For example, the information access request can be received from the XDMC 106a to access information in the XML document 104. The ACP interface 1206 (FIG. 12) confirms the access permissions of the principal associated with the XDMC 106a (block 1904) as indicated in the ACP A 110a of FIG. 1. The ACP interface 1206 also determines based on the ACP A 110a whether to use the element-accessibility rule 604 (FIGS. 6 and 12) to generate a view or subset (e.g., the view 602 of FIG. 6) (block 1906). If the ACP A 110a indicates that views or subsets should be generated using the element-accessibility rule 604, the XDMS 108 generates the requested view or subset using the element-accessibility rule 604 as discussed above in connection with the example process of FIG. 14 (block 1908). However, if the ACP A 110a does not indicate that the view should be generated using the element-accessibility rule 604 (block 1906), the ACP interface 1206 determines whether to use the blank placeholders 704 (FIG. 7) to generate the requested view or subset (e.g., the view 702 of FIG. 7) (block 1910).

If the ACP A 110a indicates that views should be generated using the blank placeholders 704 (block 1910), the XDMS 108 generates the requested view or subset using the blank placeholders 704 as discussed above in connection with the example process of FIG. 16 (block 1912). However, if the ACP A 110a does not indicate that views should be generated using the blank placeholders 704 (block 1910), the ACP interface 1206 determines whether to use server-client index mapping information (e.g., the server index 804 of FIG. 8 or the index mapping structure 904 of FIG. 9) to generate the requested view or subset (e.g., the view 802 of FIG. 8 or the view 902 of FIG. 9) (block 1914). If the ACP A 110a indicates that views should be generated using server-client index mapping information (block 1914), the XDMS 108 generates the requested view or subset using the server-client index mapping information (block 1916) as discussed above in connection with the example process of FIG. 17.

Returning to block 1914, if the ACP A 110a does not indicate that view should be generated using server-client index mapping information (block 1914), the XDMS 108 generates the requested view or subset using the ACP document-parts index key 1102 (FIG. 11) (block 1918) as discussed above in connection with the example process of FIG. 18. After the requested view or subset is generated using the technique specified in the ACP A 110a, the example process of FIG. 19 is ended.

FIG. 20 is a block diagram of an example processor system 2010 that may be used to implement the example methods and apparatus described herein. For example, processor systems substantially similar or identical to the example processor system 2010 may be used to implement the rules interface 1202, the policy interface 1204, the ACP interface 1206, the notifier 1208, the document interface 1212, the parser 1214, the blank inserter 1216, the view assembler 1218, and/or the communication interface 1222 of the XDMS 108 of FIGS. 1-4 and 6-12.

As shown in FIG. 20, the processor system 2010 includes a processor 2012 that is coupled to an interconnection bus 2014. The processor 2012 may be any suitable processor, processing unit, or microprocessor. Although not shown in FIG. 20, the system 2010 may be a multi-processor system and, thus, may include one or more additional processors that are identical or similar to the processor 2012 and that are communicatively coupled to the interconnection bus 2014.

The processor 2012 of FIG. 20 is coupled to a chipset 2018, which includes a memory controller 2020 and an input/output (I/O) controller 2022. A chipset provides I/O and memory management functions as well as a plurality of general purpose and/or special purpose registers, timers, etc. that are accessible or used by one or more processors coupled to the chipset 2018. The memory controller 2020 performs functions that enable the processor 2012 (or processors if there are multiple processors) to access a system memory 2024 and a mass storage memory 2025.

In general, the system memory 2024 may include any desired type of volatile and/or non-volatile memory such as, for example, static random access memory (SRAM), dynamic random access memory (DRAM), flash memory, read-only memory (ROM), etc. The mass storage memory 2025 may include any desired type of mass storage device including hard disk drives, optical drives, tape storage devices, etc.

The I/O controller 2022 performs functions that enable the processor 2012 to communicate with peripheral input/output (I/O) devices 2026 and 2028 and a network interface 2030 via an I/O bus 2032. The I/O devices 2026 and 2028 may be any desired type of I/O device such as, for example, a keyboard, a video display or monitor, a mouse, etc. The network interface 2030 may be, for example, an Ethernet device, an asynchronous transfer mode (ATM) device, an 802.11 device, a digital subscriber line (DSL) modem, a cable modem, a cellular modem, etc. that enables the processor system 2010 to communicate with another processor system.

While the memory controller 2020 and the I/O controller 2022 are depicted in FIG. 20 as separate functional blocks within the chipset 2018, the functions performed by these blocks may be integrated within a single semiconductor circuit or may be implemented using two or more separate integrated circuits.

Although certain methods, apparatus, and articles of manufacture have been described herein, the scope of coverage of this disclosure is not limited thereto. To the contrary, this disclosure covers all methods, apparatus, and articles of manufacture fairly falling within the scope of the appended claims either literally or under the doctrine of equivalents.

What is claimed is:

1. A tangible computer readable medium storing instructions which cause a processor of a network apparatus to at least:
   use an attribute to associate server document index values with XML elements of an XML document; and
   generate a subset XML document for a principal that is requesting the XML document,
      the principal having access rights to a subset of the XML document,
      the subset XML document including the subset of the XML document, and each part of the subset XML document corresponding to a respective one of the XML elements for which the principal has access rights,
      each part of the subset XML document corresponding to a client index value that the attribute associates with a respective one of the server document index values,
      each part of the subset XML document being individually addressable for accessing in the subset XML document by an XDM client (XDMC) after the XDMC receives the subset XML document based on a respective one of the server document index values of each part that the attribute associates with a corresponding one of the client index values, and
      the subset XML document to show parts of the XML document for which the XDMC is assigned access permissions without other parts of the XML document for which the XDMC is not assigned access permissions.

2. The computer readable medium of claim 1, wherein each server document index value is associated with a corresponding one of the XML elements specified by an XML element named sequence.

3. The computer readable medium of claim 1, wherein the XML elements are specified by an XML element named sequence in the XML document, and wherein the XML element named sequence provides an XML representation of an ordered set of element types within the XML document.

4. The computer readable medium of claim 1, wherein the XDMS is compliant with the Open Mobile Alliance (OMA) XDM Enabler specification.

5. The computer readable medium of claim 1, wherein the instructions further cause the processor to:
   send the subset XML document to the XDMC; and
   commit, via the XDMS, a requested document change in the XML document, the requested document change associated with at least one of the XML elements, and the requested document change to be committed using the attribute to determine a server document index of the at least one of the XML elements.

6. A network apparatus comprising:
   a processing device configured to:
   execute an extensible markup language (XML) document management (XDM) server (XDMS), the XDMS being configured to use an attribute to associate server document index values with XML elements of an XML document; and
   generate a subset XML document for a principal that is requesting the XML document,
      the principal having access rights to a subset of the XML document, the subset XML document including the subset of the XML document, and
      each part of the subset XML document corresponding to a respective one of the XML elements for which the principal has access rights,
      each part of the subset XML document corresponding to a client index value that the attribute associates with a respective one of the server document index values,
      each part of the subset XML document being individually addressable for accessing in the subset XML document by an XDM client (XDMC) based on a respective one of the server document index values of each part associated with the attribute after the XDMC receives the subset XML document, and
      the subset XML document to show parts of the XML document for which the XDMC is assigned access permissions without other parts of the XML document for which the XDMC is not assigned access permissions.

7. The apparatus of claim 6, wherein each server document index value is associated with a corresponding one of the XML elements specified by an XML element named sequence.

8. The apparatus of claim 6, wherein the XML elements are specified by an XML element named sequence in the XML document, and wherein the XML element named sequence provides an XML representation of an ordered set of element types within the XML document.

9. The apparatus of claim 6, wherein the XDMS is compliant with the Open Mobile Alliance (OMA) XDM Enabler specification.

10. The apparatus of claim 6, wherein the processing device is further configured to:
    send the subset XML document to the XDMC; and
    commit, via the XDMS, a requested document change in the XML document, the requested document change associated with at least one of the XML elements, and the requested document change to be committed using the attribute to determine a server document index of the at least one of the XML elements.

11. A network apparatus comprising:
    a processing device configured to:
    execute an extensible markup language (XML) document management (XDM) server (XDMS), the XDMS being configured to use an attribute to associate server document index values with XML elements of an XML document stored in the XDMS;

receive a subset XML document from a principal, the subset XML document storing a subset of parts of the XML document, and each part of the subset XML document corresponding to a respective one of the XML elements for which the principal has access rights, each part of the subset XML document corresponding to a client index value that the attribute associates with a respective one of the server document index values, each part of the subset XML document being individually addressable for accessing in the subset XML document by an XDM client (XDMC) based on a respective one of the server document index values of each part associated with the attribute, and the subset XML document showing the subset of the parts of the XML document for which the XDMC is assigned access permissions without other parts of the XML document for which the XDMC is not assigned access permissions; and commit a change to at least one of the XML elements in the XML document based on one of the parts stored in the subset XML document received from the principal, the at least one of the XML elements in the XML document identified based on a corresponding one of the client index values that the attribute associates with a respective one of the server document index values corresponding to the at least one of the XML elements in the XML document.

12. A network apparatus as defined in claim 11, wherein the XDMS is compliant with the Open Mobile Alliance (OMA) XDM Enabler specification.

\* \* \* \* \*